(12) United States Patent
Munson, Jr.

(10) Patent No.: US 6,789,000 B1
(45) Date of Patent: Sep. 7, 2004

(54) MICROPROCESSOR-BASED CONTROL SYSTEM FOR GAS TURBINE ELECTRIC POWERPLANT

(75) Inventor: Bill C. Munson, Jr., Porthill, ID (US)

(73) Assignee: Altek Power Corporation, Kelowna (CA)

( * ) Notice: Subject to any disclaimer, the term of this patent is extended or adjusted under 35 U.S.C. 154(b) by 0 days.

(21) Appl. No.: 10/123,715

(22) Filed: Apr. 16, 2002

(51) Int. Cl.[7] .............................................. G05D 17/00
(52) U.S. Cl. ..................... 700/287; 700/289; 700/290; 477/30; 477/31; 477/121; 60/239; 60/226.1; 60/237; 361/51
(58) Field of Search ................................. 700/287, 289, 700/290; 477/30, 31, 121; 60/239, 226.1, 237; 361/51; 290/40 R, 40 A

(56) References Cited

U.S. PATENT DOCUMENTS

| | | | |
|---|---|---|---|
| 4,259,835 | 4/1981 | Reed et al. | 60/39.28 R |
| 4,283,634 | 8/1981 | Yannone et al. | 290/40 R |
| 4,301,375 | 11/1981 | Anderson | 290/1 R |
| 4,308,463 | 12/1981 | Giras et al. | 290/1 |
| 4,314,441 | 2/1982 | Yannone et al. | 60/39.28 R |
| 4,341,071 | 7/1982 | Abo et al. | 60/39.14 R |
| 4,504,190 | 3/1985 | Beeloo | 415/166 |
| 4,506,503 | 3/1985 | Ogborne et al. | 60/39.281 |
| 4,536,126 | * 8/1985 | Reuther | 700/287 |
| 4,537,024 | 8/1985 | Grosjean | 60/39.161 |
| 4,794,544 | * 12/1988 | Albright et al. | 700/287 |
| 5,185,693 | 2/1993 | Loftis et al. | 364/187 |
| 5,237,816 | 8/1993 | Duffy et al. | 60/39.182 |
| 5,333,458 | 8/1994 | Loving | 60/722 |
| 5,372,005 | 12/1994 | Lawler | 60/39.02 |
| 5,408,957 | 4/1995 | Crowley | 123/27 GE |
| 5,419,112 | 5/1995 | Farrell | 60/39.15 |
| 5,678,408 | 10/1997 | Janes | 60/728 |
| 5,709,076 | 1/1998 | Lawlor | 0/39.35 |
| 5,838,588 | * 11/1998 | Santoso et al. | 700/287 |
| 5,896,741 | 4/1999 | Etheridge | 60/39.23 |
| 6,088,630 | 7/2000 | Cawlfield | 700/266 |
| 6,148,617 | 11/2000 | Williams | 60/737 |

* cited by examiner

Primary Examiner—Leo Picard
Assistant Examiner—Charles Kasenge
(74) Attorney, Agent, or Firm—Standley Law Group LLP

(57) ABSTRACT

A microprocessor-based control system for a gas turbine electrical powerplant the microprocessor-based control system controls the startup, operation, and shutdown of the gas turbine electric powerplant. The microprocessor-based control system of the present invention dispenses with the need to utilize relays, timers, or other control hardware. Rather, the microprocessor-based control system employs software that replaces the control hardware, and directly reads the inputs, calculates the control actions, and writes the outputs. The microprocessor-based control system is also in electrical communication with an overspeed control system, provided to ensure that a runaway condition of the gas turbine engine does not occur should the gas turbine engine become disconnected from the speed reducer (gearbox) or generator. Sensors are used to monitor multiple operating conditions of the powerplant. The microprocessor-based control system communicates with the sensors, and activates the overspeed control system if an overspeed condition is detected.

23 Claims, 24 Drawing Sheets

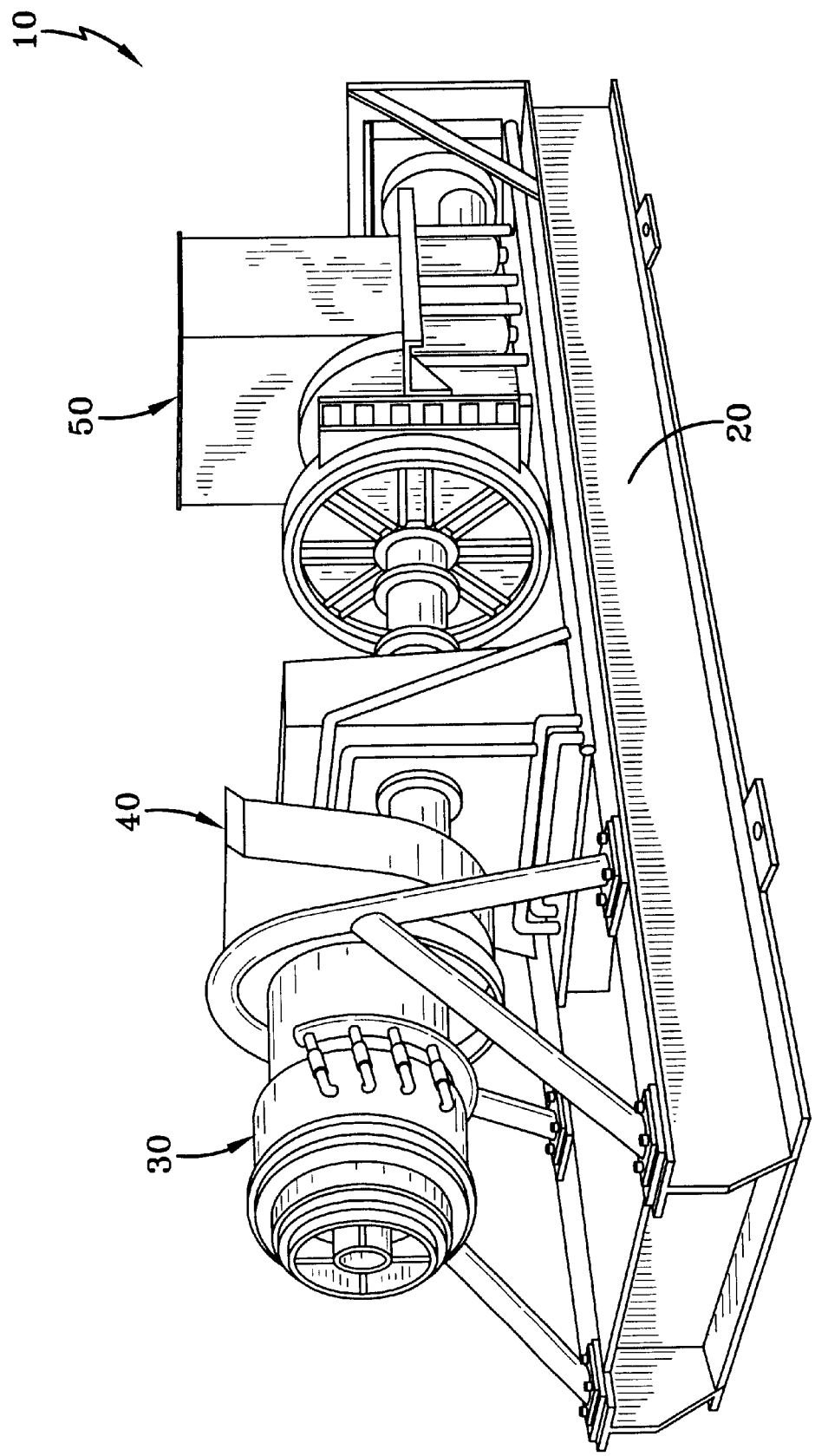

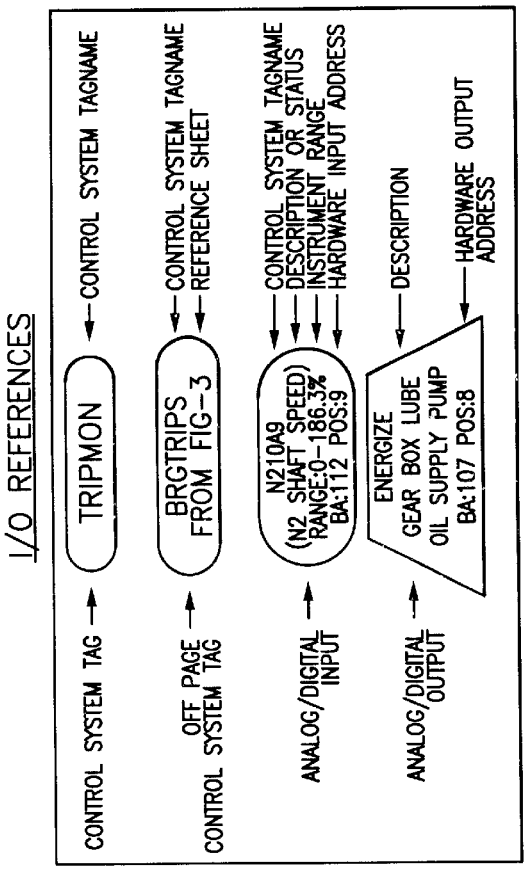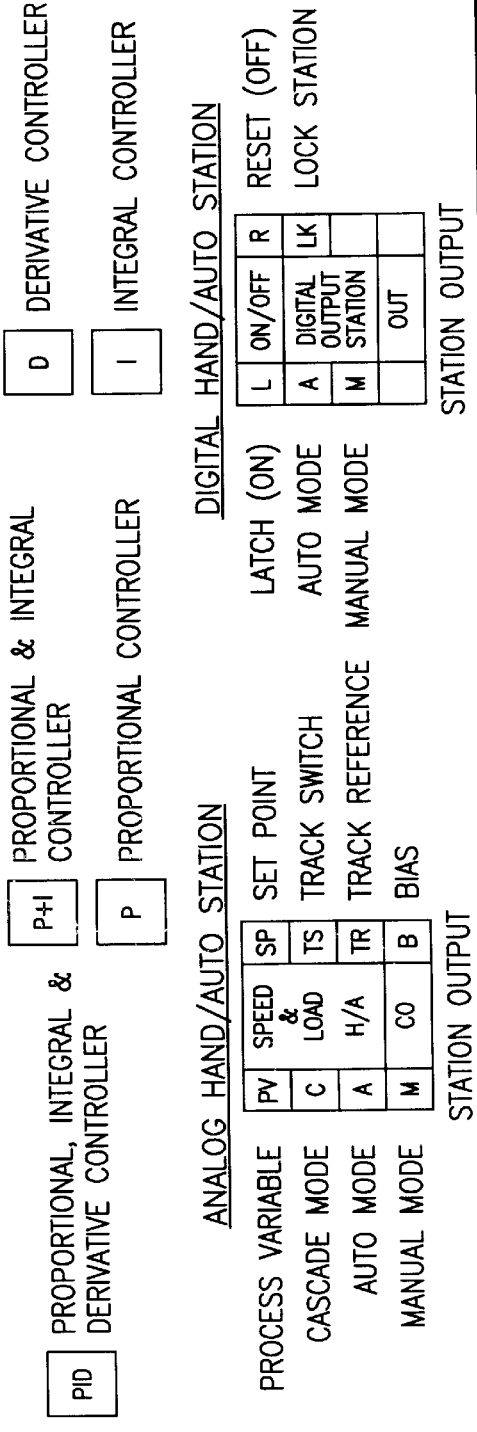
FIG-2A

FUNCTION BLOCKS

| Symbol | Name | Description |
|---|---|---|
| T | ANALOG TRANSFER | |
| F(x) | FUNCTION GENERATOR | SQUARE ROOT |
| ⋇ | HI & LOW LIMITER | H/L — TRUE WHEN SIGNAL >= HIGH LIMIT OR SIGNAL <= LOW LIMIT |
| Σ | SUMMER | HH/ — TRUE WHEN SIGNAL >= HIGH HIGH LIMIT |
| X | MULTIPLIER | H/ — TRUE WHEN SIGNAL >= HIGH LIMIT |
| ÷ | DIVIDER | /L — TRUE WHEN SIGNAL <= LOW LIMIT |
| Δ | DELTA (DIFFERENCE) | /LL — TRUE WHEN SIGNAL <= LOW LOW LIMIT |
| ∇ | VELOCITY LIMITER | ⊠ NOT |
| ∧ | HIGH SELECT | LATCHING RELAY WITH RESET OVERRIDE |
| ∨ | LOW SELECT | LATCHING RELAY WITH LATCH OVERRIDE |
| F(t) | LAG | TDPU — TIME DELAY TO PICK UP |
| | | TDDO — TIME DELAY TO DROP OUT |
| 2 OF 3 | | TRUE WHEN 2 OR MORE SIGNALS ARE TRUE |
| 1.0 | | ANALOG REAL NUMBER |
| 1 | | BOOLEAN ONE (TRUE) |
| 0 | | BOOLEAN ZERO (FALSE) |
| DELAY / X SEC | | ANALOG DELAY (X SECONDS) |
| STR RST COUNTDOWN TIMER START COUNT | | COUNT DOWN TIMER (COUNTS IN SECONDS) |
| STR RST COUNTUP TIMER START COUNT | | COUNT UP TIMER (COUNTS IN SECONDS) |
| AND | | AND GATE |
| OR | | OR GATE |

FIG-2B

PRE-START CHECKLIST

○ IGV Control Auto
○ Eng Pump Auto RUN
○ Eng Fan Auto STOP
○ G/B Fan Auto STOP
○ G/B Pump Auto STOP
○ Start Fuel Auto
○ IGN Auto
○ Eng Pre-Lube On

FIG-15

Auto Start

○ Red Gear Oil On
○ G/B Oil Press. not Low
○ Fuel Pump Auto STOP
○ Fuel Control un-Lock
○ Starter on Lock
○ Fuel Control Auto 1.00
    Ignition Off
    Start Fuel Off

FIG-16

```
Interlocks
    Reset Alarms ☐
    Reset E-stop ☐
      ○ N2 Overspeed
      ○ N1 Overspeed
      ○ G/B Oil Pressure
      ○ G/B Oil Temp
      ○ Eng Oil Pressure
      ○ Exhaust Temp
      ○ Eng Oil Pressure
    CLOSED Overspeed valve
    OPEN   Ace valve
```
FIG-17
| Fuel Control | | | |
|---|---|---|---|
| P  2.61 | | | |
| S  1.00 | 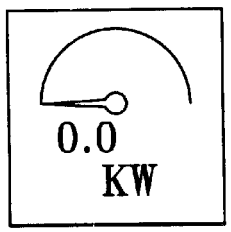 | 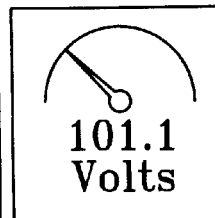 | 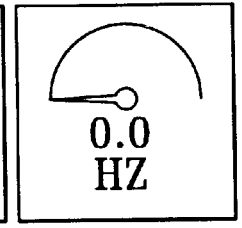 |
| O  3.94 | 0.0 | 101.1 | 0.0 |
| Auto | KW | Volts | HZ |
| | | | |
|---|---|---|---|
| 470.2 | EGT (F) | 0.0 | Engine Hours |
| 4.50 | N2 RPM | 7.3 | Engine Oil (PSI) |
| 2.0 | N1 RPM | 12.2 | Fuel (SCFM) |
| 82.4 | IN (F) | 24.8 | G/B Oil (PSI) |
| 19.5 | Shaft Speed | 140.4 | G/B Oil Temp |
| 50.4 | Gen Speed | 152.8 | Eng Oil Temp |
FIG-18

MICROPROCESSOR-BASED CONTROL SYSTEM FOR GAS TURBINE ELECTRIC POWERPLANT

BACKGROUND AND SUMMARY OF THE INVENTION

The present invention relates to a microprocessor-based control system for operating a gas turbine electric powerplant. The gas turbine electric powerplant uses a turbine engine, such as an aircraft engine, to operate an electric generator that produces electric power. The microprocessor-based control system provides for the proper start-up, operation, and shut-down of the gas turbine electric powerplant, as well as for monitoring and turbine overspeed control. The microprocessor-based control system allows the gas turbine electric powerplant to be operated safely, even in an unattended condition.

There are numerous situations wherein it may be desirable to use a gas turbine electric powerplant of the present invention. For example, it may be necessary to provide electric power to a remote area that is not supplied by a utility company. Electric power consuming operations that are commonly conducted in remote areas include, for example, drilling for oil and natural gas. Such operations may require more power than can be supplied by typical gas or diesel generators. When such an operation is too remote to receive power from a utility, the gas turbine electric powerplant of the present invention may be used to supply electric power to the operation. Similarly, the gas turbine electric powerplant of the present invention can be used when electric power production is required on only a temporary basis. For example, in the above-described remote drilling operation, utility power may be available, but connection costs may be prohibitive based on the short period of time during which electric power will be required. Such a situation may also occur during large-scale, remote construction projects.

The gas turbine electric powerplant of the present invention may also be used to provide backup power during interruption of electric power supplied from a utility or other source. The gas turbine electric powerplant of the present invention may be brought online in as little as 30–60 seconds, thereby preventing long periods of down time. Use of the gas turbine electric powerplant for backup power may be highly effective for commercial buildings, manufacturing facilities, hospitals, or other locations wherein a long term interruption of electric power is particularly problematic.

One or more of the gas turbine electric powerplants of the present invention may also be used in a variety of other ways by a producer of electric power. For example, an electric utility may utilize one or more of the gas turbine electric powerplants to provide load-leveling or peak shaving during periods of high demand for electric power. Utilities commonly struggle with the problem of meeting peak demand, which occurs typically at particular times of the day, and is usually more severe during certain times of the year. Peak demand is the result of consumers using more electricity at particular times of the day than at others; for example, during the waking hours as opposed to during the nighttime hours. To meet peak demand, a utility's power generating plants must typically be overdesigned—meaning that they only run near peak efficiency during periods of high demand. Therefore, for the majority of a given day, the power plant runs at a reduced output and, unfortunately, a lower efficiency. By employing the gas turbine electric powerplant of the present invention, utility power generating plants could be designed to meet only average demand while running at optimum efficiency. One or more of the gas turbine electric powerplants of the present invention could then be tied to the utility's power distribution and transmission grid, and when peak demands arise, the gas turbine electric powerplants can be operated to inject additional electric power into the grid. The control system of the gas turbine electric powerplant of the present invention can provide for automatic start-up and operation when high demand is detected. When the demand ebbs, the gas turbine electric powerplants can be shut down as needed. The portability of the gas turbine electric powerplant of the present invention also allows additional units to be set up at a utility if needed to meet increasing peak demand. Such a situation may occur when a particular area, or areas, served by a utility grows at a faster than expected rate. In this manner, both the cost of building a power generating plant and the cost of producing electricity may be reduced, while still ensuring that peak demand can be met.

The gas turbine electric powerplant of the present invention can also be used as a source of co-generation electric power. For example, the gas turbine electric powerplant may be installed at an industrial facility and tied into the facility's electric power transmission and distribution system in order to augment the electric power supplied by an electric utility company. The cost to purchase electric power from a utility may vary throughout a given day or week. For example, it is common for large industrial facilities to be limited in the amount of power they may use, or to otherwise be charged a significantly elevated price during periods of high demand. Such may occur, for example, during periods of extreme weather, when the general consumption of electric power typically increases. When such a situation exists, the industrial facility may operate one or more of the gas turbine electric powerplants to supplement the electric power it receives from the utility. In this manner, the industrial facility can avoid having to either reduce its power consumption or pay a higher cost for electric power during such periods.

The gas turbine electric powerplant of the present invention can also be used as a source of distributed power generation. As certain populated areas grow, the demand for electric power generally increases. Many times, the provider of electric power does not have the capacity to meet the increased demand. Electric utilities often form cooperatives, or otherwise enter into agreements wherein electric power may be sold and delivered between the utilities. Thus, if one utility cannot meet demand, and a second utility has excess capacity, the second utility may sell blocks of power to the first utility. The first utility may be at a disadvantage, because the cost to purchase and transfer the electric power to the area of demand may be high. The second utility is able to take advantage of its excess capacity by selling and distributing the electricity to other providers. The gas turbine electric powerplant of the present invention can be used to take advantage of growing markets, by allowing a provider to produce additional electric power that may be sold to other providers without sufficient capacity. Alternatively, the gas turbine electric powerplant of the present invention may be used by a provider to obviate the need for purchasing additional electric power from another utility. Rather, the provider may use the gas turbine electric powerplant to produce incremental electric power in small blocks, minimizing large incremental power block purchases from other utilities. The gas turbine electric powerplant can be located to provide electric power wherever it is needed. For example, the gas turbine electric powerplant may be placed at a distribution substation and tied into a utility's transmission and distribution lines.

The gas turbine electric powerplant of the present invention uses a gas turbine engine to run an electric generator. Preferably, the gas turbine electric powerplant uses an aeroderivative gas turbine engine, such as is designed for a helicopter. The turbine engine may be purchased new, or may be removed from an aircraft and retrofitted for use in the gas turbine electric powerplant. Although a variety of turbine engines may be employed, preferably the turbine engine is a turboshaft engine.

A gearbox is preferably used to reduce the output speed of the turbine engine to a predetermined value. While the turbine engine may have an internal gear reduction, an external gearbox is typically required to obtain the proper input speed to the generator. While a gearbox with a fixed speed reduction can be used, it is also possible to use a gearbox with a variable output speed. The input of the gearbox is connected to the output shaft of the turbine engine by a specialized coupling.

The output shaft of the gearbox is connected to the input shaft of an electric power generator. Rotation of the generator's input shaft and windings produces electric power that can be output to a specific load or into the power grid of an electric utility. The generator can be selected to provide the desired voltage and power output.

The gas turbine electric powerplant is designed to operate on both liquid and gaseous fuels that can provide a sufficient BTU output. Specific microprocessor-controlled fuel valves are provided based on the type of fuel that will be used to run the gas turbine electric powerplant. The fuel valves may be changed if it is desired to change the type of fuel used with the gas turbine electric powerplant. The microprocessor-based design of each type of fuel valve allows the valve to communicate with and respond to instructions from the gas turbine electric powerplant's microprocessor-based control system.

The assembled components of the gas turbine electric powerplant may reside on a common base, preferably on a transportable skid. Alternatively, a non-transportable installation may be accomplished, such as on the floor of a factory, or a concrete mounting pad. A specialized mounting frame is provided to receive and restrain the gas turbine engine. The frame is designed to maintain the centerline of the turbine engine despite the thermal expansion thereof. In transportable form, the size and weight of the gas turbine electric powerplant components and skid allow it to be transported by truck to virtually any site where electric power is needed. Therefore, the gas turbine electric powerplant of the present invention may provide a portable source of significant electric power production that may be utilized to meet a number of consumer needs.

Whatever the application, a microprocessor-based control system is provided to operate and monitor the gas turbine electric powerplant. The microprocessor-based control system automates the start-up, operation, and shutdown of the gas turbine electric powerplant. During operation of the gas turbine electric powerplant, the microprocessor-based control system monitors a multitude of powerplant conditions, such as, for example, fuel flow, various temperatures, turbine speed, and many other conditions, and makes any necessary adjustments to ensure that the gas turbine electric powerplant runs at optimal efficiency. The microprocessor-based control system is also in electrical communication with other control systems that are provided to effect the automatic shutdown of the gas turbine engine should the gas turbine engine become disconnected from the gearbox or generator. The microprocessor-based control system preferably provides for real time control and trend capabilities, based on the monitored conditions and on user settings. An operator interface is provided to allow for, among other things, the input of set points and the viewing of powerplant conditions.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIG. 1 is an isometric view of one embodiment of a gas turbine electric powerplant of the present invention;

FIG. 2 defines the symbols used in the following schematic diagrams;

FIG. 15 illustrates one embodiment of a screen display used prior to start-up of the gas turbine electric powerplant of the present invention;

FIG. 16 illustrates one embodiment of a screen display used during start-up of the gas turbine electric powerplant of the present invention;

FIG. 17 illustrates a partial view of one embodiment of a screen display used during monitoring of the gas turbine electric powerplant of the present invention; and FIG. 18 is another partial view of the screen display of FIG. 17.

DETAILED DESCRIPTION OF THE EXEMPLARY EMBODIMENT(S)

Figure 3A:
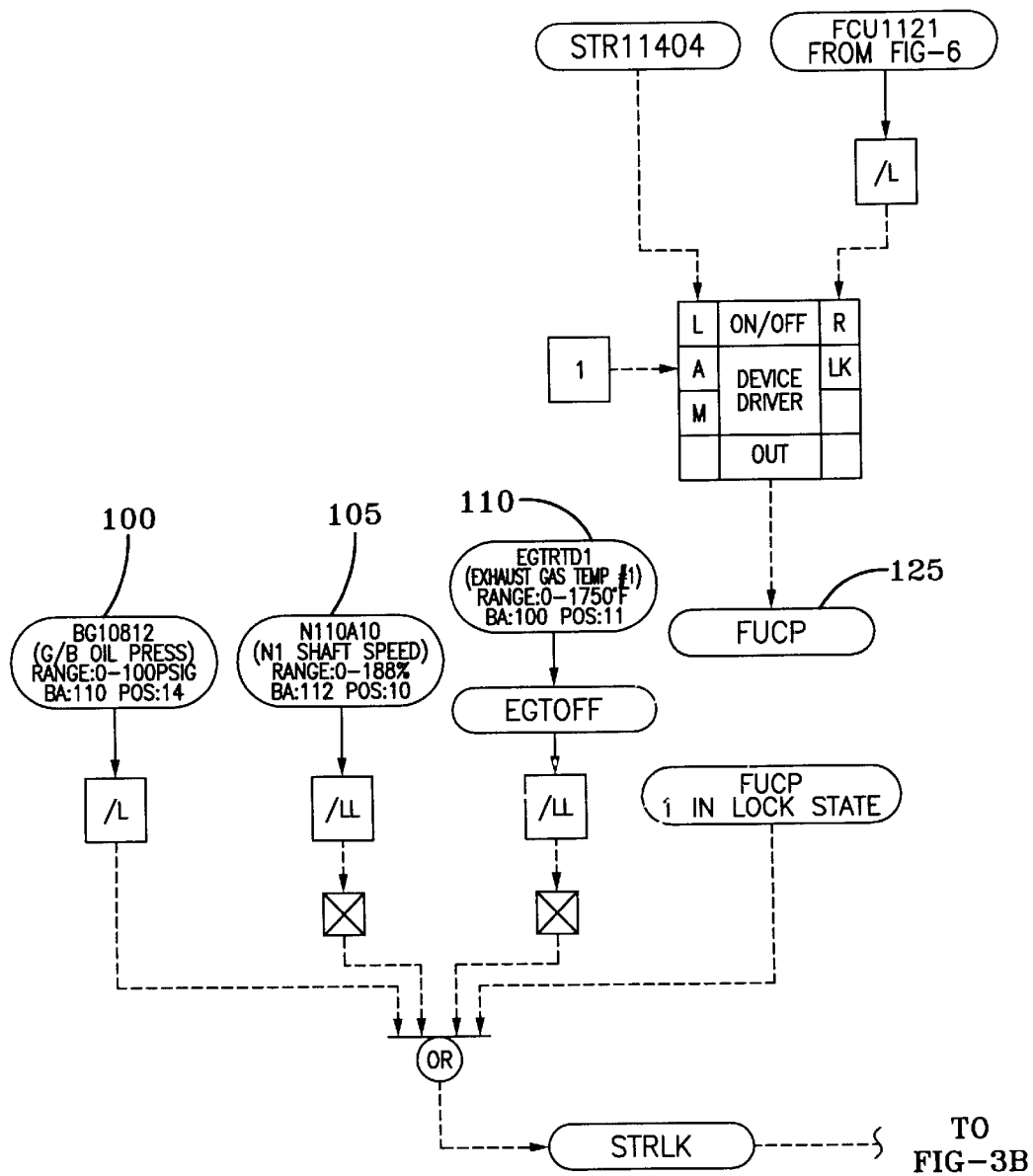
FIG. 3 is a schematic diagram representing the logic used by a starter and igniter portion of one embodiment of the gas turbine electric powerplant microprocessor-based control system of the present invention.

An isometric view of one embodiment of a gas turbine electric powerplant 10 of the present invention can be observed in FIG. 1. The gas turbine electric powerplant 10 preferably resides on a unitary base, such as the skid 20 shown. In this manner, the entire gas turbine electric powerplant 10 can be easily and conveniently transported to virtually any location requiring electric power production. It is also possible, however, to assemble the gas turbine electric powerplant 10 onto a fixed mounting surface, such as, for example, the floor of a factory.

The gas turbine electric powerplant 10 is shown to be powered by a gas turbine engine 30. The gas turbine engine 30 may be aeroderivative, such as is intended for use in a helicopter or other aircraft. Preferably, the gas turbine engine 30 is a turboshaft engine, wherein an output shaft connected to a turbine within the engine is provided for coupling to an external device. The use of a turboshaft-type turbine engine 30 is preferred over other types of turbine engine designs because the turboshaft engine exhibits very little residual thrust, and is, therefore, easier to harness. Various turboshaft engines may be employed to drive the gas turbine electric powerplant 10 of the present invention. In this particular embodiment of the present invention, the gas turbine engine 30 is a Lycoming T-53 series turboshaft engine. The gas turbine engine 30 produces in excess of 1,400 shaft horsepower, at output shaft rotational speeds of up to approximately 21,000 revolutions per minute. The gas turbine engine 30 of this particular embodiment of the gas turbine electric powerplant 10 is also of split shaft design; meaning that there are separate compressor and power turbines within the gas turbine engine. Because of the high rotational speeds and torque output that is generated by the gas turbine engine 30, a specialized mounting system is used to secure the turbine engine 30 to the skid 20 or other mounting surface.

The gas turbine electric powerplant 10 is designed to operate effectively on a number of different fuels of both a liquid and gaseous variety. Preferably, however, the fuel is able to provide a thermal energy output of at least 600 BTU per cubic foot. Examples of acceptable liquid fuels include, among others, gasoline, diesel fuel, jet fuel, kerosene, and isopropyl alcohol. Acceptable gaseous fuels may include, among others, hydrogen, natural gas, propane, butane, and isopropane. The particular gas turbine electric powerplant 10 described in detail herein is adapted to operate on natural gas. The selected fuel is supplied from the fuel source to the turbine engine via a microprocessor-controlled fuel metering valve (not shown).

When a liquid fuel is used to power the gas turbine engine 30, a liquid fuel valve is employed to meter the fuel supply. The liquid fuel valve preferably has an integrated microprocessor that allows the valve to exhibit fast response times. The valve preferably also features a built-in flow meter that outputs fuel flow as a standard analog signal, and a flow-through design to minimize the effect of contaminates. The liquid fuel metering valve is in electronic communication with the gas turbine electric powerplant's microprocessor-based control system. The microprocessor integrated within the valve compares the demand signal being sent to the valve with the fuel flow signal from the built-in flow meter. The microprocessor then makes adjustments to the orifice in order to equalize the fuel demand with the fuel flow. In conjunction with the gas turbine electric powerplant's control software, changes in demand may be anticipated by the integrated microprocessor. When a gaseous fuel is used to power the turbine engine 30, a gaseous fuel valve is installed on the gas turbine electric powerplant 10. Like the liquid fuel valve, the gaseous fuel valve preferably makes use of an integrated microprocessor based electronic controller. The valve preferably features a main poppet valve that is controlled by internal gas pressure. A standard analog signal corresponding to an input fuel demand that is proportional to measured fuel flow is output by the valve. The inputs are then compared by the gas turbine electric powerplant's control software, with appropriate adjustments made to the fuel flow to maintain operating stability.

The output shaft of the gas turbine engine 30 is coupled to the input of a speed reducing gearbox 40 to obtain a desired final output shaft speed for driving a generator 50. The final output shaft speed may vary depending on the particular generator that is driven by the gas turbine engine 30. In this particular embodiment of the gas turbine electric powerplant 10, the final output shaft speed is selected to be approximately 1,800 revolutions per minute when driven at the substantially normal operating speed of the turbine engine 30. It is also possible to couple a variable speed gearbox to the output shaft of the turbine engine 30, whereby variable speed reductions thereof may be achieved.

An output shaft of the gearbox 40 is connected to the input shaft of an electric power generator 50. Various generators may be employed by the gas turbine electric powerplant 10 to provide electric power. The specific operating parameters of the generator can be selected based on the particular application to which the gas turbine electric powerplant 10 will be applied. For example, the generator 50 may provide a 3-phase, 480 volt output at 50–60 Hz, and approximately 1.2 MW of power at substantially normal gas turbine engine operating speed.

A cooling system is preferably provided to treat various components of the gas turbine electric powerplant 10 during operation. In this embodiment, the cooling system consists of two separate, closed cooling loops. One cooling loop provides cooling to the gearbox 40. The other cooling loop provides inlet pressure and the cooling necessary for continuous operation of the gas turbine engine 30. The cooling pumps preferably draw cooling fluid from one or more cooling fluid reservoirs for circulation to the gearbox 40 and gas turbine engine 30. The cooling fluid in each cooling loop is preferably also circulated through a heat exchanger that is associated with each cooling loop. Each heat exchanger may also be provided with one or more cooling fans to provide increased cooling of the cooling fluid when necessary.

Based on the many uses for a gas turbine electric powerplant 10 of the present invention, it is desirous that the gas turbine electric powerplant be able to run in an unattended condition. To this end, it is necessary to ensure the automatic and safe shutdown of the turbine engine 30 should the turbine engine become disconnected from the gearbox or generator. If the turbine engine 30 becomes disconnected from the gearbox 40 or generator 50, or the load imparted by the gearbox or generator is somehow removed, and operation of the gas turbine engine 30 is allowed to continue without intervention, the rotational speed of the gas turbine engine will likely increase beyond a safe limit. This condition is often referred to as an "overspeed" condition or as a "runaway" condition. An overspeed condition can lead to the failure of the gas turbine engine 30, or more seriously, to the break up of the gas turbine engine. Therefore, runaway of the gas turbine engine 30 must be prevented for both operational and safety reasons. To this end, the gas turbine electric powerplant 10 of the present invention employs multiple systems for controlling an overspeed condition and causing the safe shutdown of the turbine engine 30—even when an operating gas turbine electric powerplant is left unattended. More specifically, the gas turbine electric powerplant 10 utilizes a combination of a unique overspeed air dump (compression relief system, and a novel air directing system, each of which are controlled by the gas turbine electric powerplant's microprocessor-based control system and software, to detect an overspeed condition and control the gas turbine engine 30 accordingly. In addition, one or more turbine speed sensors are also preferably provided, with the capability of directly closing the fuel supply valve if an overspeed condition is detected.

The compression relief system employed by the gas turbine electric powerplant 10 of the present invention, acts to remove operating air from the gas turbine engine 30 if an overspeed condition is detected. Preferably, compression relief outlets are located around the periphery of the gas turbine engine 30 to communicate with the inlet portion of the turbine engine's combustion section. A specialized manifold is preferably provided to communicate with each of the compression relief outlets, such as by way of, for example, rigid or flexible tubing. In the case of an overspeed condition, air is transferred from the turbine engine 30 to the manifold through the compression relief outlets. The manifold may be adapted to direct the air to the atmosphere or to a collection apparatus, preferably through one or more exhaust lines. Preferably, the exhaust line(s) is routed through an electronic solenoid valve, such that the pathway to the atmosphere is restricted unless an overspeed condition occurs. The compression relief system is activated by the gas turbine electric powerplant's microprocessor-based control system, in response to a signal from one or more sensors provided to detect an overspeed (runaway) condition.

An air directing system, or inlet guide vane (IGV) control system is also provided to work in conjunction with the compression relief system. The air directing system is adapted to control the angle at which air entering the turbine engine 30 impinges the engine's compressor blades. The air directing system preferably uses an electromechanical actuator to dictate the angle at which the air flow contacts the compressor blades. The electromechanical actuator is connected to an adjusting rod. The adjusting rod enters the turbine engine 30, and is physically connected to the inlet guide vanes (not shown) of the compressor section. When an overspeed condition is detected by the control software, a signal is sent to the electromechanical actuator that results in movement of the adjusting rod, and a corresponding de-optimization of the angle that air entering the turbine engine 30 impinges the engine's compressor blades. The result of this adjustment is a reduction in compressor speed and, therefore, a slowdown of the turbine engine 30.

A microprocessor-based control system is used to control the start-up, shutdown, and operation of the gas turbine electric powerplant 10. The control system may be PC-based. Preferably, the microprocessor-based control system is located in one or more control cabinets that are attached to the skid 20, or otherwise near the gas turbine electric powerplant 10. However, remote control is also possible, such as from a centralized control area. An operator interface is preferably provided for permitting powerplant operators to start, stop, and monitor powerplant operation. The operator can preferably enter lab data, set data, set points, outputs, and controller modes, and may acknowledge alarms, and perform multiple other tasks from, for example, a keyboard or a touch screen. Several views are preferably available that enable the operator to monitor various aspects of the gas turbine electric powerplant. The control system may also provide predictive modeling to allow the fastest and most accurate calculation and attainment of operation set points.

The control system receives inputs from a multitude of sensors positioned at various locations throughout the gas turbine electric powerplant 10 (as will be described in more detail below). The microprocessor-based control system of the present invention dispenses with the need to utilize relays, timers, or other control hardware. Rather, the microprocessor-based control system employs software that replaces the control hardware, and directly reads the inputs, calculates the control actions, and writes the outputs.

A multitude of sensors are provided for monitoring gas turbine electric powerplant conditions and for reporting those conditions to the microprocessor-based control system. Sensors may be provided to monitor and report on, for example, inlet air temperature, exhaust gas temperature, oil tank temperature, generator winding temperature, generator bearing temperature, gearbox bearing temperature, oil pressure, compressor turbine speed, power turbine speed, generator current, generator potential, and inlet guide vane position. Other powerplant conditions may also be monitored and used by the microprocessor-based control system. The sensors may include thermocouples, resistance temperature detectors (RTD's), pressure transducers, and a variety of other sensing devices.

The microprocessor-based control system employs unique software for controlling the operation of the gas turbine electric powerplant 10. The software includes individual sub-control systems, or routines, for controlling individual components of the gas turbine electric powerplant 10. The sub-control systems may receive data from sensors, from other sub-control systems, or may use analog values input by an operator of the gas turbine electric powerplant 10. Sub-control systems are provided to control, among other things, the fuel control valve, fuel shutoff valve, starter motor, gas turbine engine igniters, oil pumps, oil cooling fans, inlet guide vane positioner, compressor bleed solenoid valve, and compressor air dump solenoid valve.

Figure 3B:
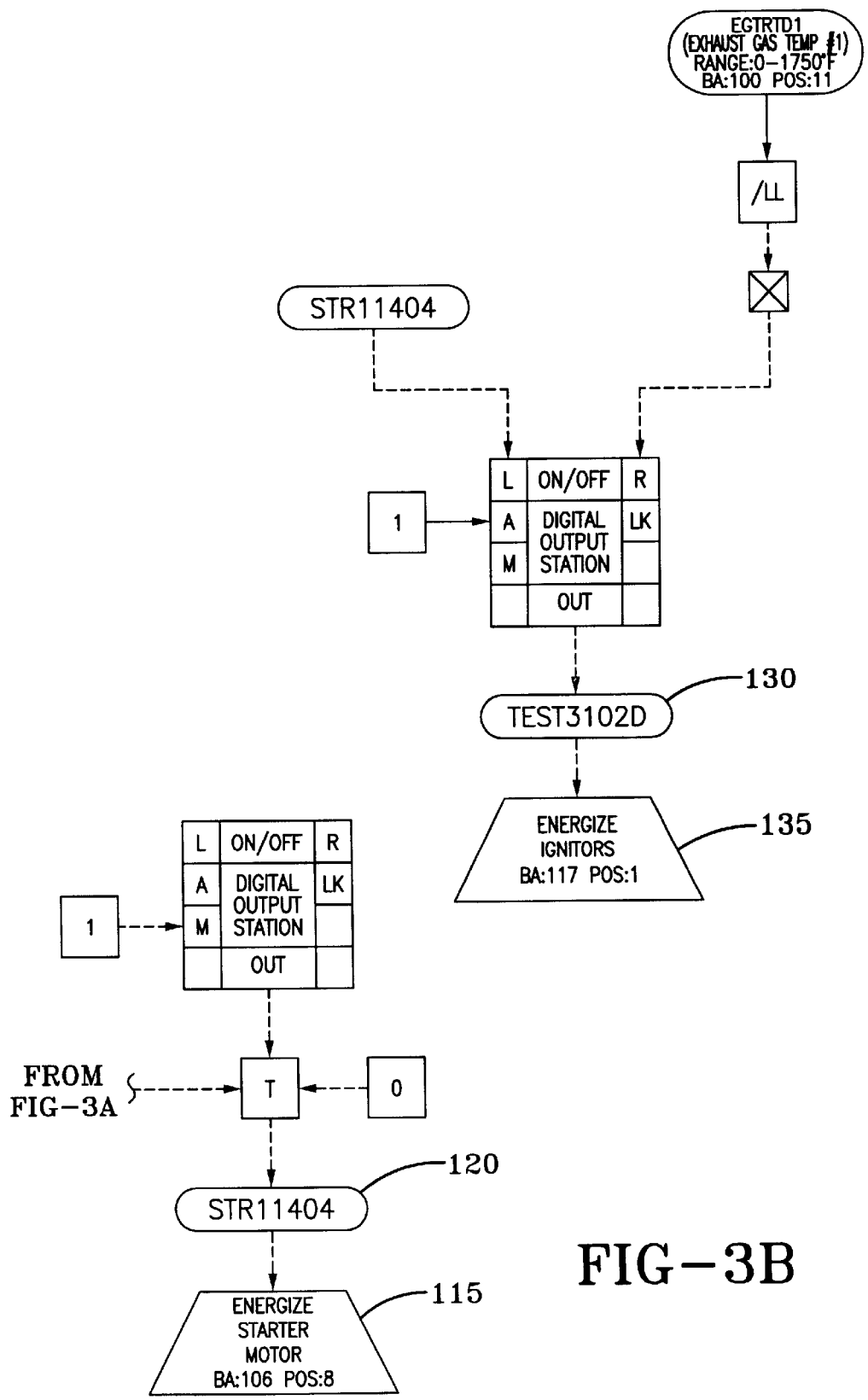
Figure 4:
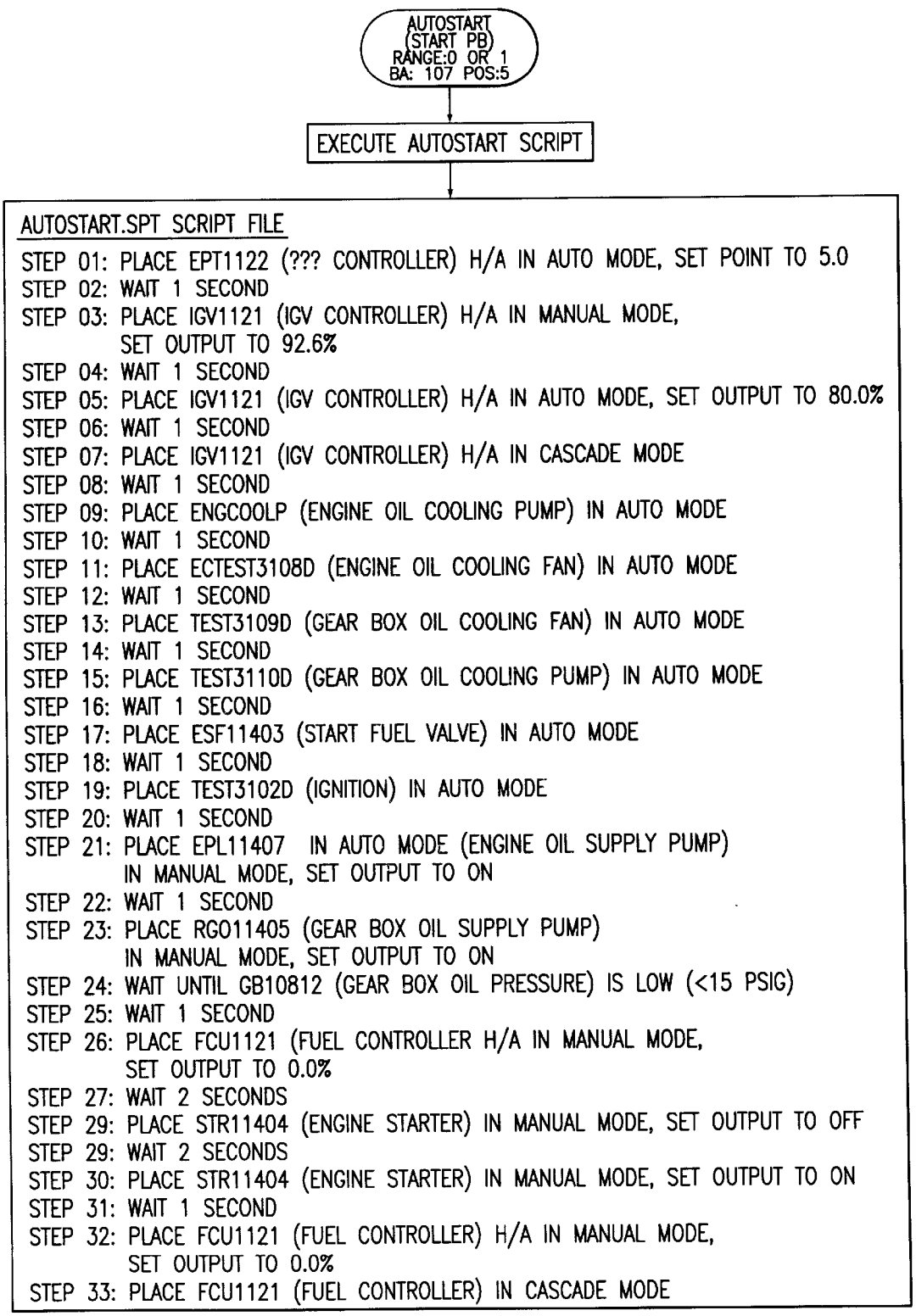
FIG. 4 depicts one embodiment of a start sequence control routine used by the gas turbine electric powerplant microprocessor-based control system of the present invention.

As can be seen in FIG. 3, once initiated by an operator, start-up of the gas turbine electric powerplant 10 is managed by the microprocessor-based control system. Sensor inputs representing gearbox oil pressure 100, N1 (compressor) turbine speed 105, and exhaust gas temperature 110 are checked to ensure that each is within allowable limits. If all relevant inputs indicate acceptable conditions, a turbine engine starter motor output 115 is energized by a corresponding starter sub-control system 120. The starter sub-control system 120 also initiates a fuel control valve sub-control system 125. The starter sub-control system 120 then automatically initiates an igniter sub-control system 130 that energizes an igniter output 135 of the gas turbine engine. Various program steps associated with the start-up process can be observed by reference to FIG. 4.

Figure 5A:
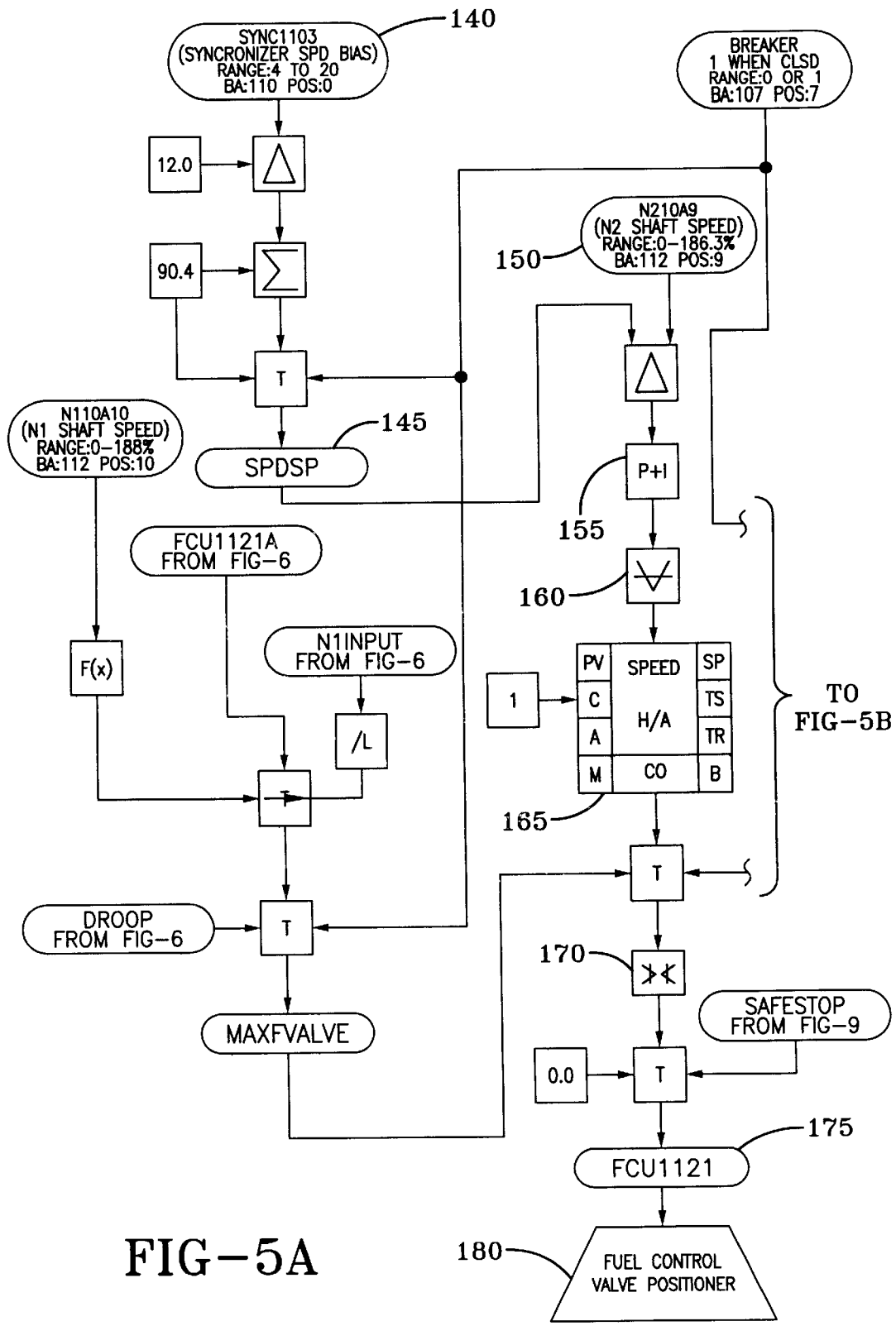
FIG. 5 is a schematic diagram representing the logic used by a speed and load control portion of one embodiment of the gas turbine electric powerplant microprocessor-based control system of the present invention.
Figure 5B:
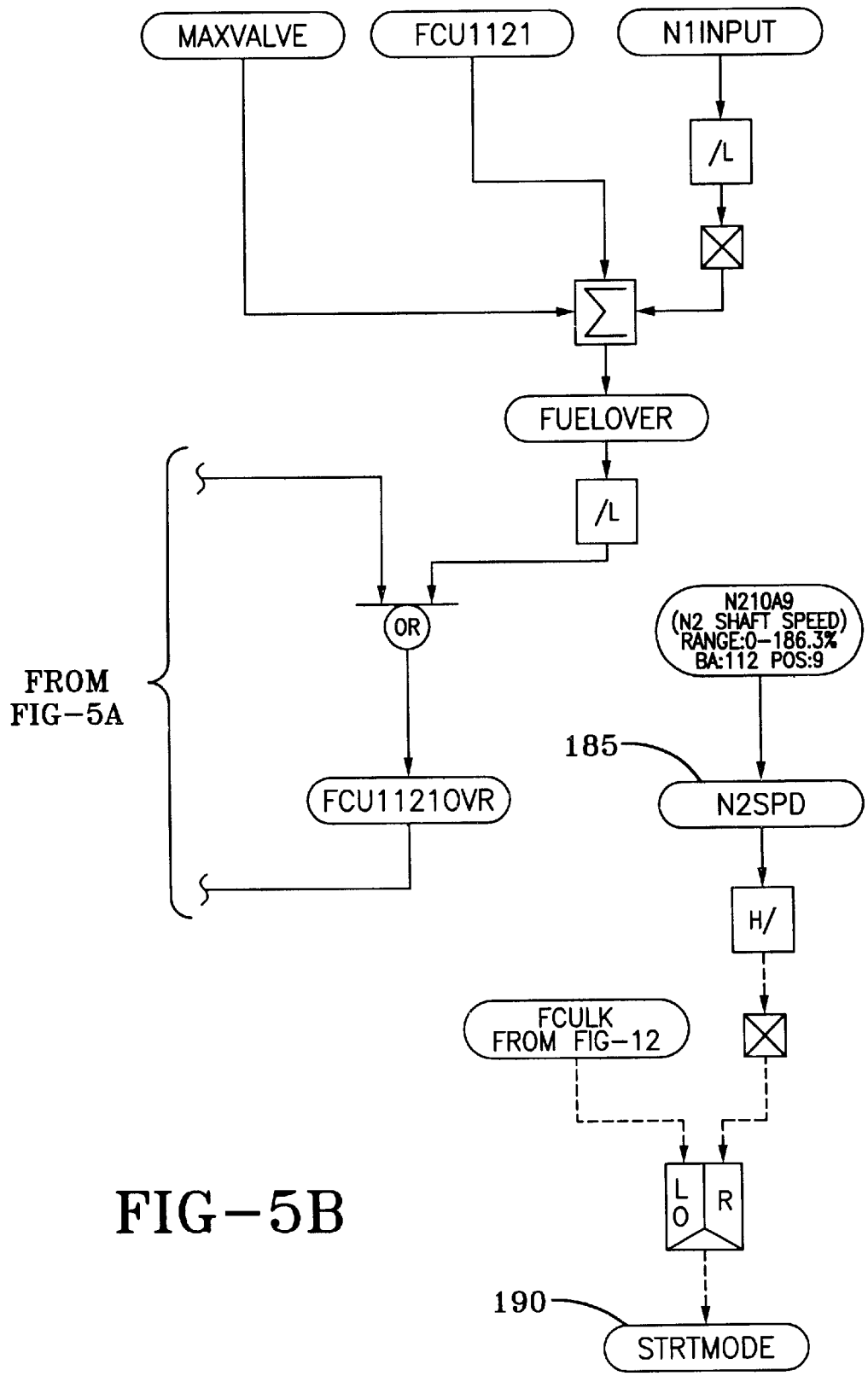

The logic associated with the speed and load control of the gas turbine electric powerplant 10 is shown in FIG. 5. A digital input signal from a speed bias synchronizer 140 is arithmetically combined with various preset analog numbers. The digital signal is then converted into an analog value, and is input to a synchronizer speed bias sub-control system 145. An output value is generated by the synchronizer speed bias sub-control system 145. The difference between the generated value and the N2 (power) turbine shaft speed, obtained from the respective sensor input 150, is then determined and output to a proportional, integral, derivative (PID) controller 155. The output of the PID controller 155 passes through a velocity limiter 160, and then through an analog hand/auto controller 165, operating in a cascade mode. The output of the analog hand/auto controller 165 is subjected to an analog transfer, which is then passed through a high & low limiter 170. A second analog value is generated after the high & low limiter 170, and is input to a fuel control valve sub-control system 175. The fuel control valve sub-control system 175 uses the analog value to calculate the proper fuel control valve setting and to then energize the fuel control valve positioner output 180. The power turbine shaft speed input 150 is also used by a power turbine sub-control system 185. The power turbine sub-control system 185, in conjunction with an output from a fuel control lockout sub-control system (described in more detail below), initiates a start mode sub-control system 190.

Figure 6A:
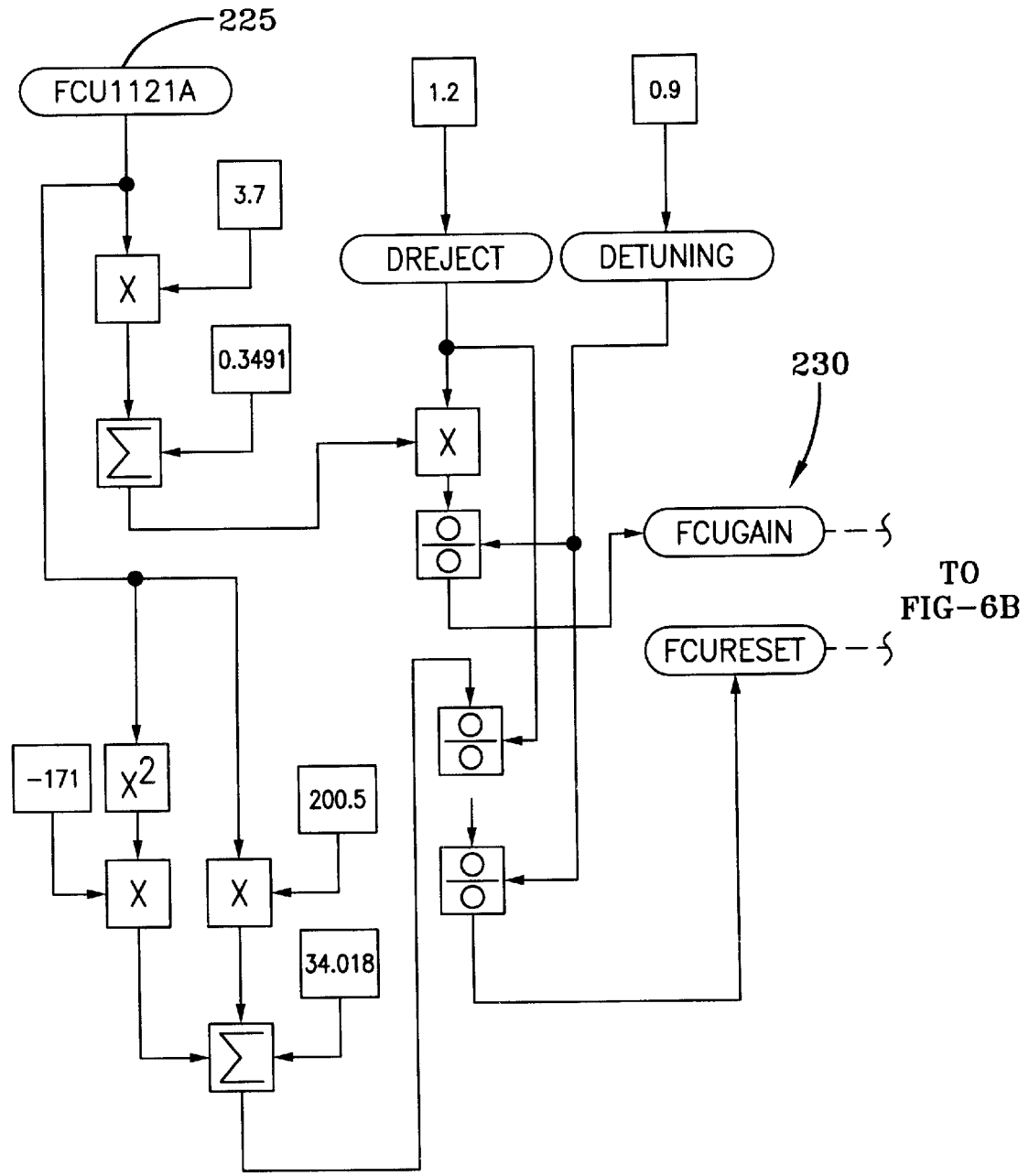
FIG. 6 is a schematic diagram representing the logic used by a fuel control valve portion of one embodiment of the gas turbine electric powerplant microprocessor-based control system of the present invention.
Figure 6B:
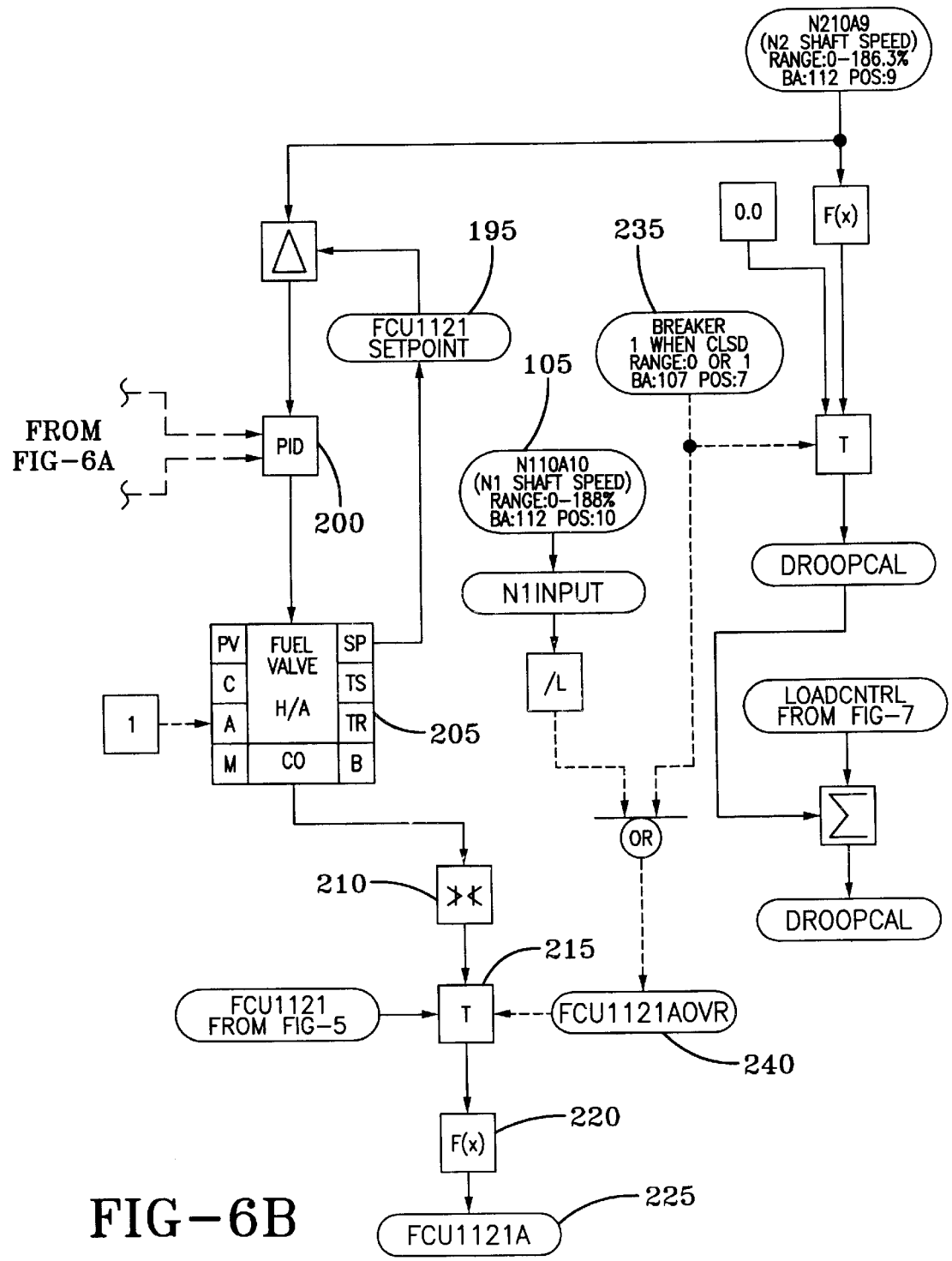

The logic corresponding with the control of the gas turbine electric powerplant's fuel control valve is illustrated in FIG. 6. As can be seen, the core logic reads the speed of the power turbine, obtained from its corresponding input 150, and uses the speed in determining the proper fuel control valve setting. The difference between the value of the power turbine speed and a fuel control valve setpoint 195 is first determined. The difference is input to a PID controller 200, whose output is fed into an analog hand/auto station 205 operating in auto mode. The signal is then passed through a high & low limiter 210 and undergoes an analog transfer 215 that also is affected by the output of the first fuel control valve sub-control system 175. The analog value is then fed to a function generator 220, prior to being input to a second fuel control valve sub-control system 225. The output generated by the second fuel control valve sub-control system 225 is also used to fine tune the fuel control valve setting. More specifically, the second fuel control valve sub-control system 225 is also used in a feedback loop that results in adjustments 230 to the fuel control valve being fed into the PID controller 200 of the core logic sequence. A second feedback loop is also provided, which uses the compressor turbine speed input 105 and a breaker input 235 as inputs to an additional fuel control valve sub-control system 240. The output of the additional fuel control valve sub-control system 240 is then used to affect the analog transfer function 215 of the core logic sequence.

Figure 7A:
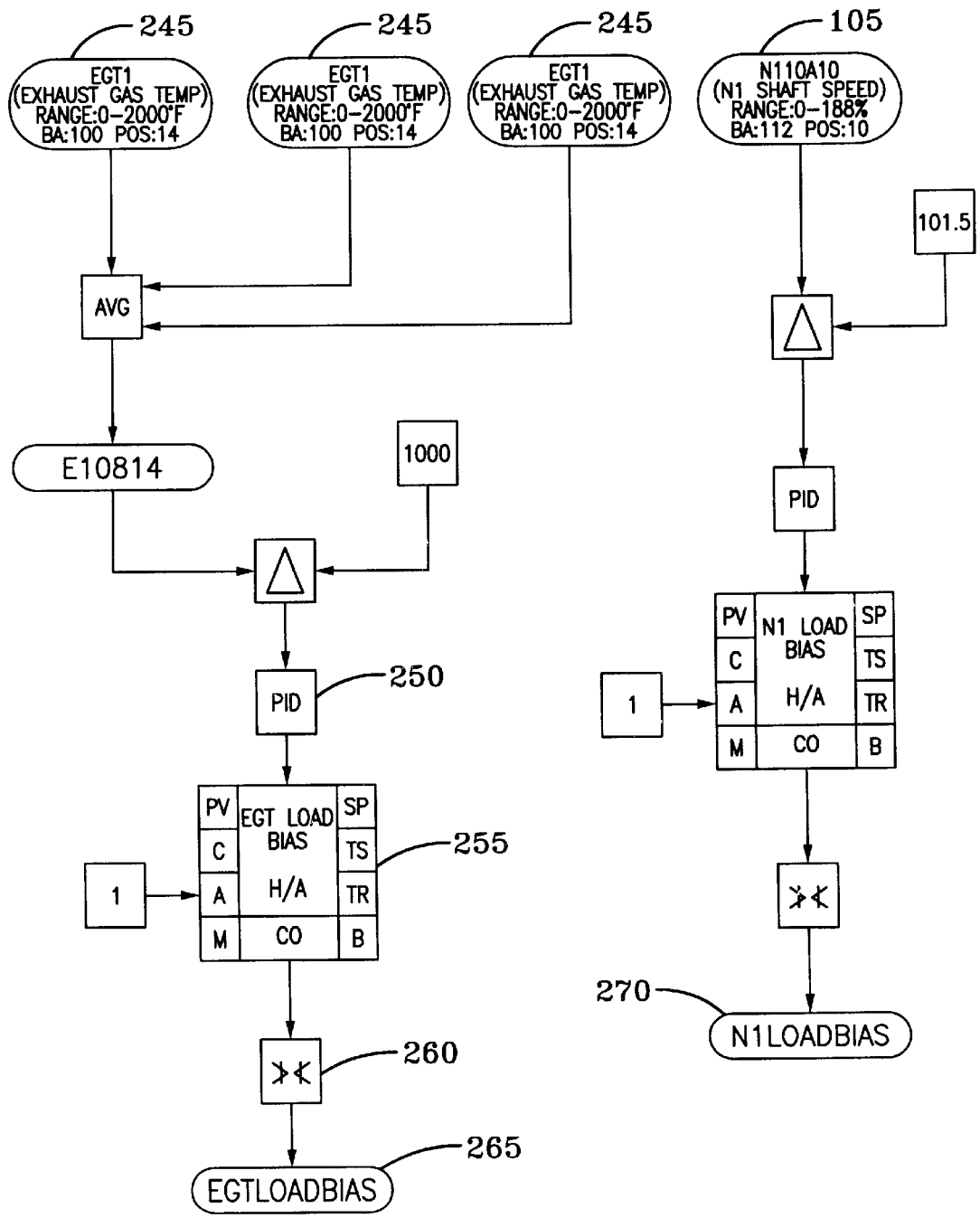
FIG. 7 is a schematic diagram representing the logic used by a load control portion of one embodiment of the gas turbine electric powerplant microprocessor-based control system of the present invention.
Figure 7B:
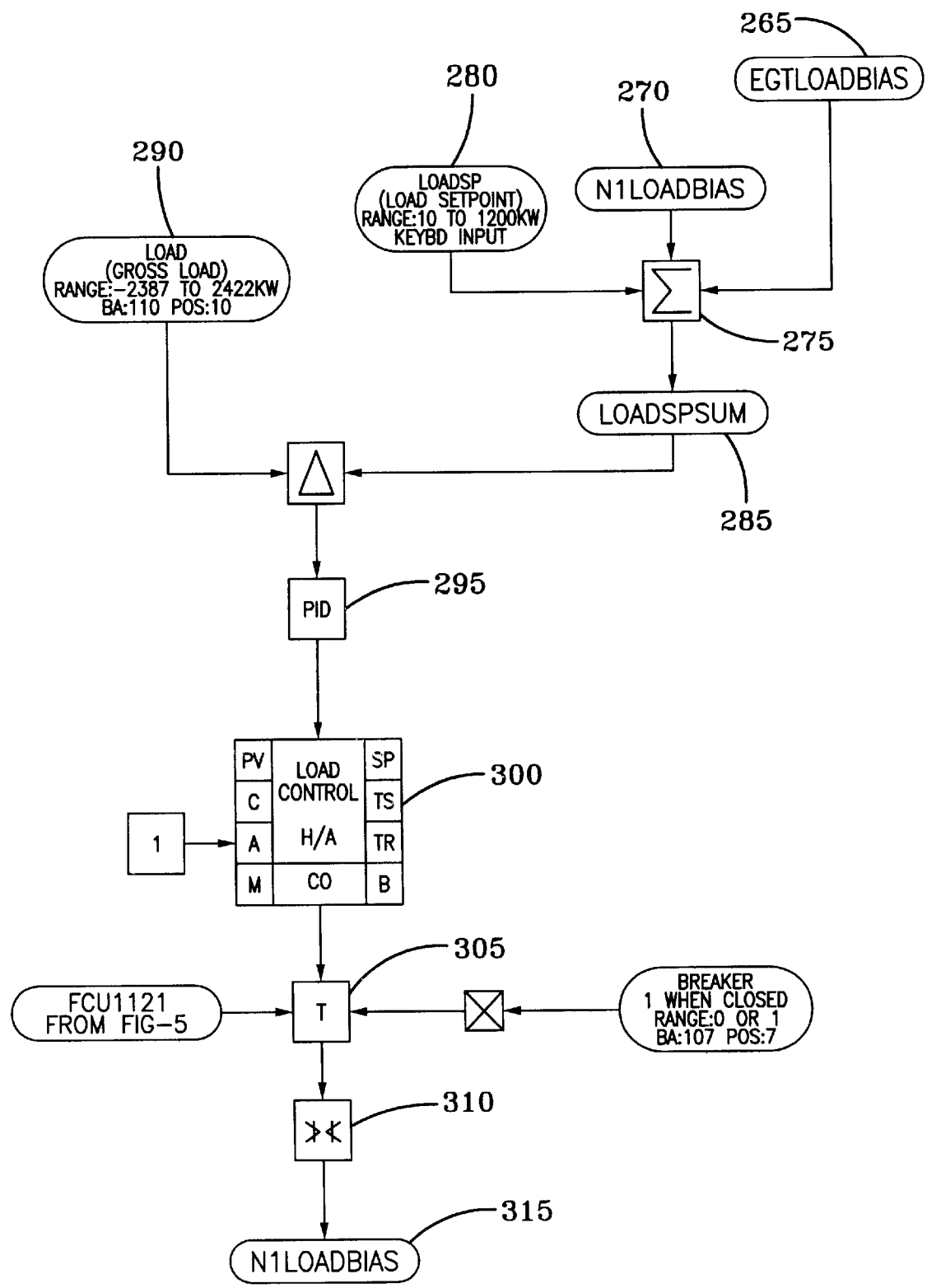

Load control of the operating gas turbine electric powerplant 10 may be accomplished as shown in the logic diagram of FIG. 7. As can be seen, an average of the exhaust gas temperature is obtained from the appropriate input 245 and compared to a setpoint value. The difference therebetween is then input to a PID controller 250, whose output is passed through a corresponding analog hand/auto station 255 operating in auto mode. The output of the analog hand/auto station 255 passes through a high & low limiter 260 before being input to an exhaust gas temperature load bias sub-control system 265. A similar process is performed using the compressor turbine shaft speed. The value obtained from the compressor shaft speed sequence is input to a compressor turbine load bias sub-control system 270. Each of the exhaust gas temperature load bias sub-control system 265 output and the compressor turbine load bias sub-control system 270 output are then summed 275 with a load setpoint input value 280. The summation 275 is input to a load setpoint sum sub-control system 285. The value of the difference between the output of the load setpoint sum sub-control system 285 and a gross load input 290 is then sent to a PID controller 295. The PID output is fed into an analog hand/auto station 300 operating in auto mode, whose output is subjected to an analog transfer 305 that may be affected by both the first fuel control valve sub-control system 175 and the breaker input 235. After the analog value is passed through a high & low limiter 310, it is fed into a load control sub-control system 315.

Figure 8:
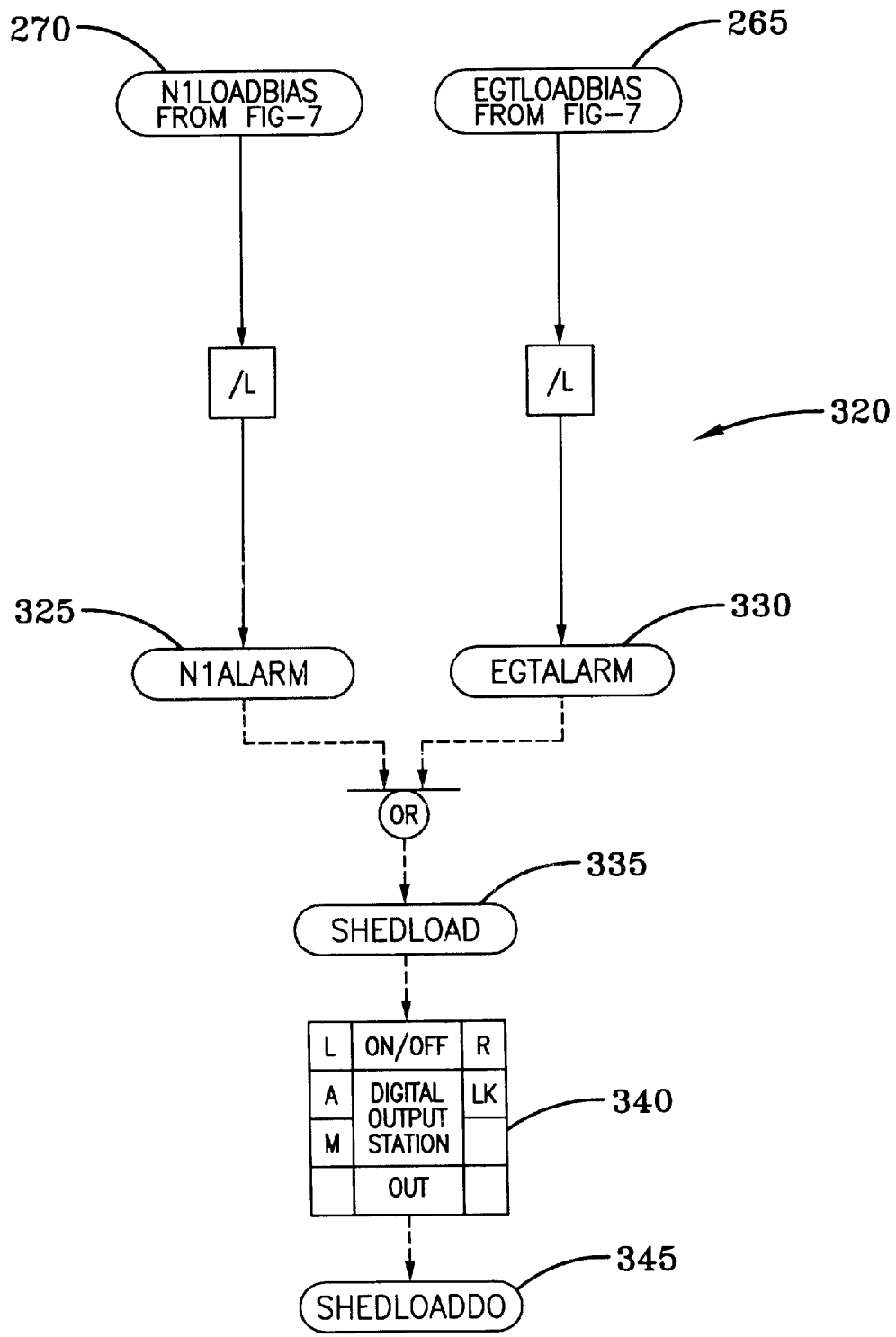
FIG. 8 is a schematic diagram representing the logic used by a load runback control portion of one embodiment of the gas turbine electric powerplant microprocessor-based control system of the present invention.

A load runback sub-control system is also provided to ensure that the gas turbine engine 30 is not subjected to an excessive load. As can be seen in FIG. 8, each of the compressor turbine sub-control system 270 and exhaust gas temperature sub-control system 265 outputs are also part of a respective alarm sub-control system 320. If either of the compressor turbine sub-control system 270 or exhaust gas temperature sub-control system 265 outputs trigger respective compressor turbine speed or exhaust gas temperature alarm sub-control systems 325, 330, a shed load sub-control system 335 is triggered. The output of the shed load sub-control system is input to a digital hand/auto station 340, whose output is used by a load shedding digital output sub-control system 345 to reduce the load on the gas turbine engine 30.

Figure 9A:
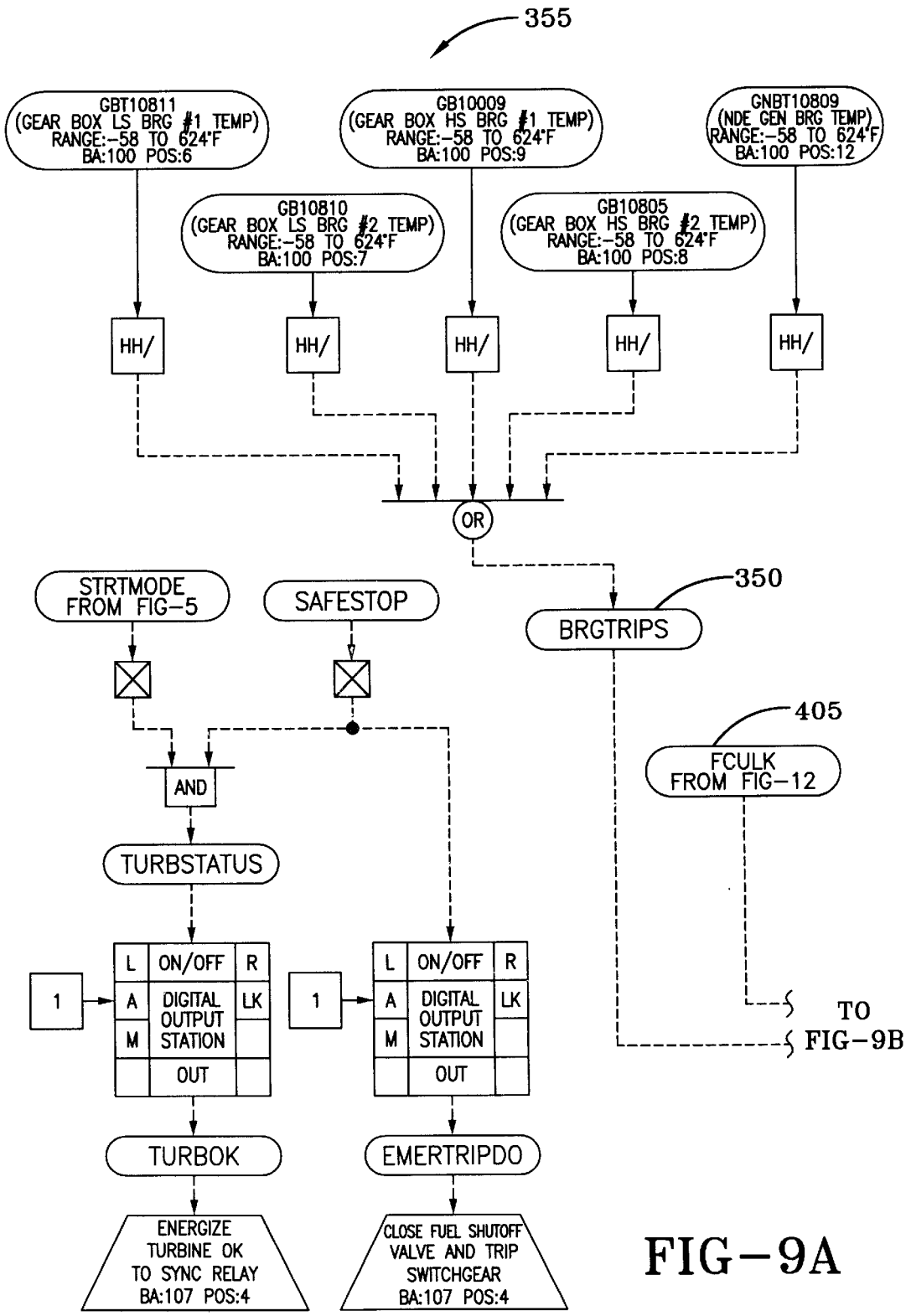
FIG. 9 is a schematic diagram representing the logic used by an emergency stop control portion of one embodiment of the gas turbine electric powerplant microprocessor-based control system of the present invention.
Figure 9B:
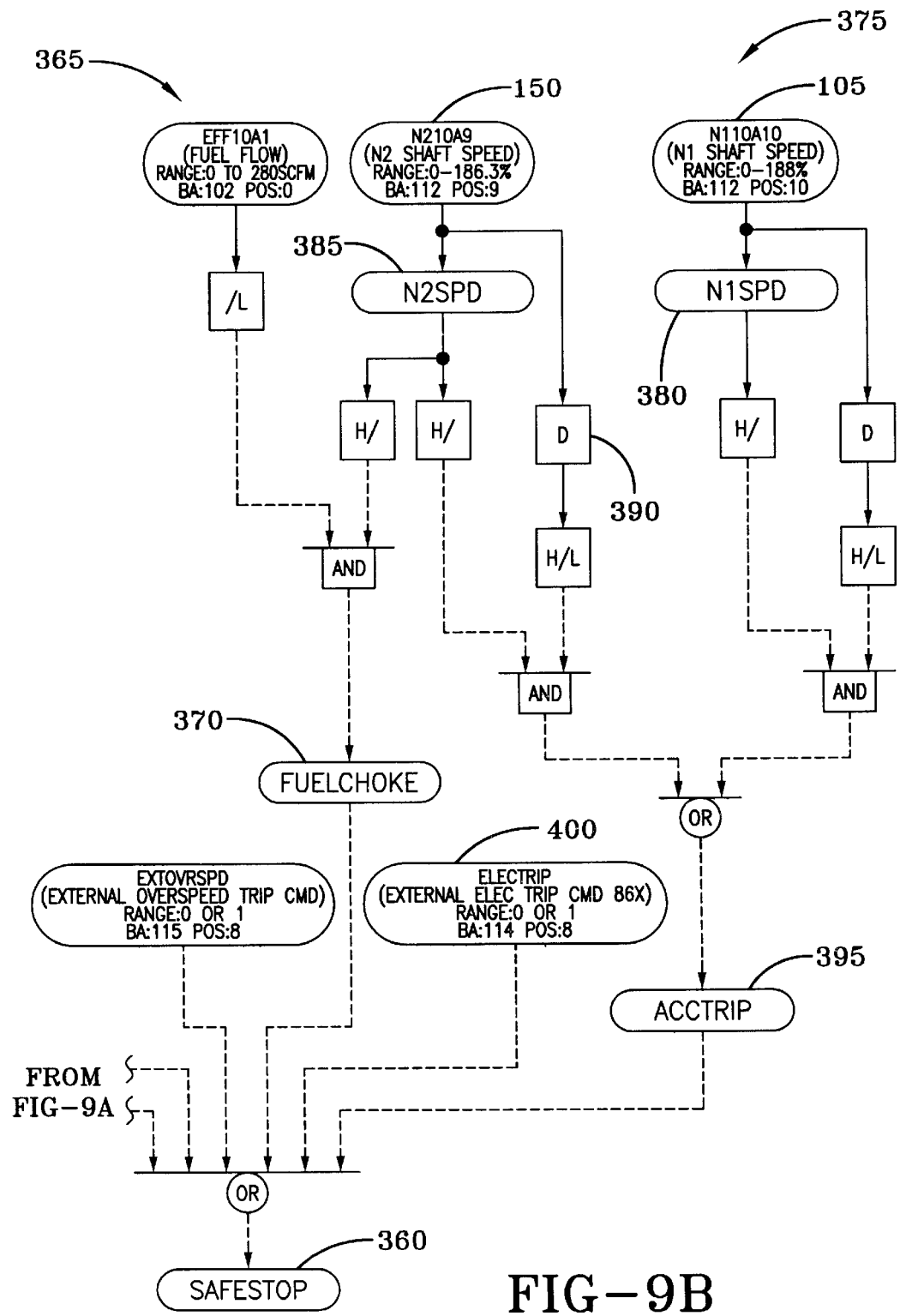

In addition to starting and operating the gas turbine electric powerplant 10, the microprocessor-based control system is also used to shutdown the gas turbine electric powerplant. The shutdown of the gas turbine electric powerplant 10 may occur as a result of operator action, or may be initiated by the microprocessor-based control system. Unless the shutdown is scheduled to occur, shutdowns initiated by the microprocessor-based control system will typically result from the detection of an undesirable operating condition. Such shutdowns will be referred to as emergency shutdowns. Emergency shutdown logic is illustrated in FIG. 9. As can be seen, in this particular embodiment of the microprocessor-based control system, multiple monitoring and trip sub-control systems are provided. In a bearing temperature sub-control trip system 350, temperature inputs associated with a series of gearbox and generator bearings are monitored. If any of these bearing temperatures exceeds a predetermined limit, the bearing sub-control trip system 350 is triggered. The output of the bearing sub-control trip system 350 then initiates a safe stop sub-control system 360 that will shut down the gas turbine electric powerplant 10. A second trip sub-control system 365 compares the speed of the power turbine with the flow of fuel through the fuel control valve. If the speed of the power turbine exceeds a predetermined value while the fuel flow falls below a predetermined value, a fuel choke sub-control trip system 370 is triggered. The output of the fuel choke sub-control trip system 370 then initiates the safe stop sub-control system 360 to shut down the gas turbine electric powerplant 10. A third trip sub-control system 375 can also be observed. The third trip sub-control system 375 uses the value of the compressor and power turbine speed inputs 105, 150 in respective turbine speed sub-control systems 380, 385. The output of each of the turbine speed sub-control systems 380, 385 is then compared to a predetermined maximum speed. The value of the turbine speed inputs 105, 150 is also input to a derivative controller 390 and then checked to see if it falls above or below a predetermined speed. If both conditions are true for either of the compressor or power turbines, an acceleration sub-control trip system 395 is triggered. The output of the acceleration sub-control trip system 395 then initiates the safe stop sub-control system 360, the output of which is used to effectuate an emergency shut down of the gas turbine electric powerplant 10. As can be seen, the safe stop sub-control system 360 may also be initiated by control system induced locking of the fuel control valve, or by an external trip 400, such as an emergency stop pushbutton or similar safety device. It should also be noted that, aside from communicating an undesirable speed condition to the microprocessor-based control system, the input of the turbine speed sensor(s) is able to directly cause the closing of the fuel control valve—thereby independently facilitating the shutdown of the gas turbine engine 30. The turbine speed sensor(s) used for this purpose may be those employed for the general monitoring of turbine speed or, alternatively, may be dedicated overspeed sensors. Specialized magnetic or optical sensors may be utilized for this purpose.

Figure 10:
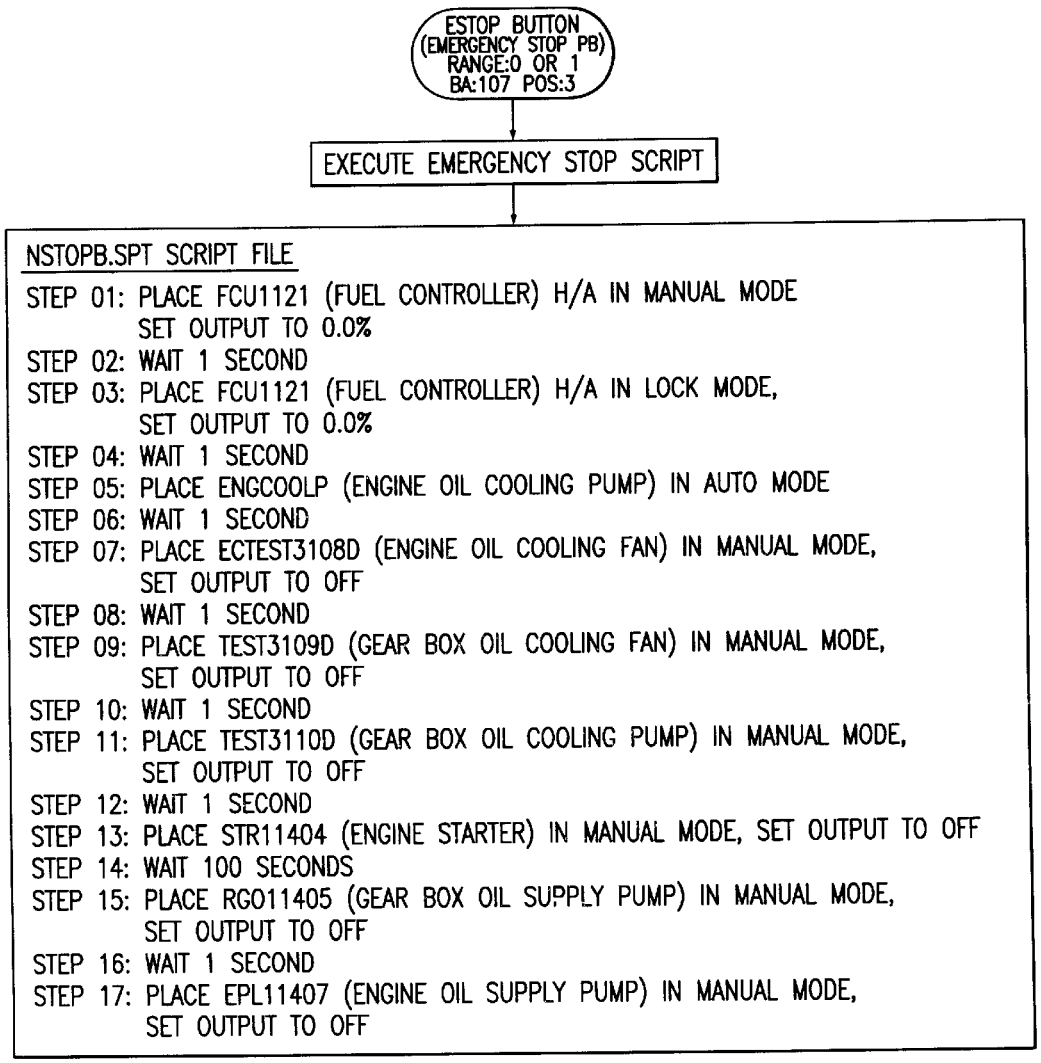
FIG. 10 depicts one embodiment of an emergency stop sequence control routine used by the gas turbine electric powerplant microprocessor-based control system of the present invention.
Figure 11:
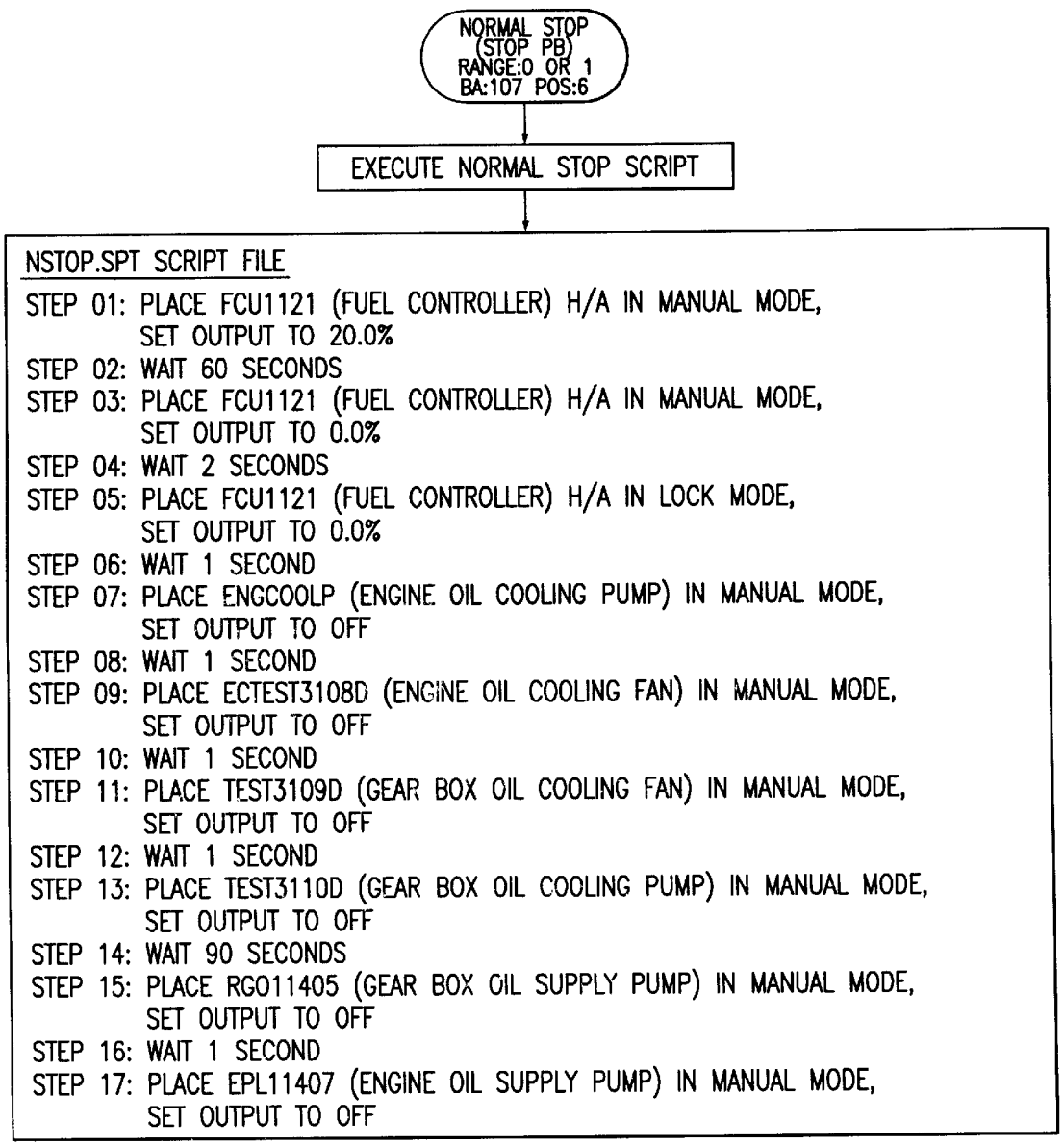
FIG. 11 depicts one embodiment of a stop sequence control routine used by the gas turbine electric powerplant microprocessor-based control system of the present invention.

Various program steps associated with the emergency shutdown process can be observed by reference to FIG. 10. For purposes of comparison, typical program steps associated with the normal shutdown process can be seen in FIG. 11. The processes are substantially similar, except for the immediate fuel cutoff of the emergency shutdown sequence.

Figure 12A:
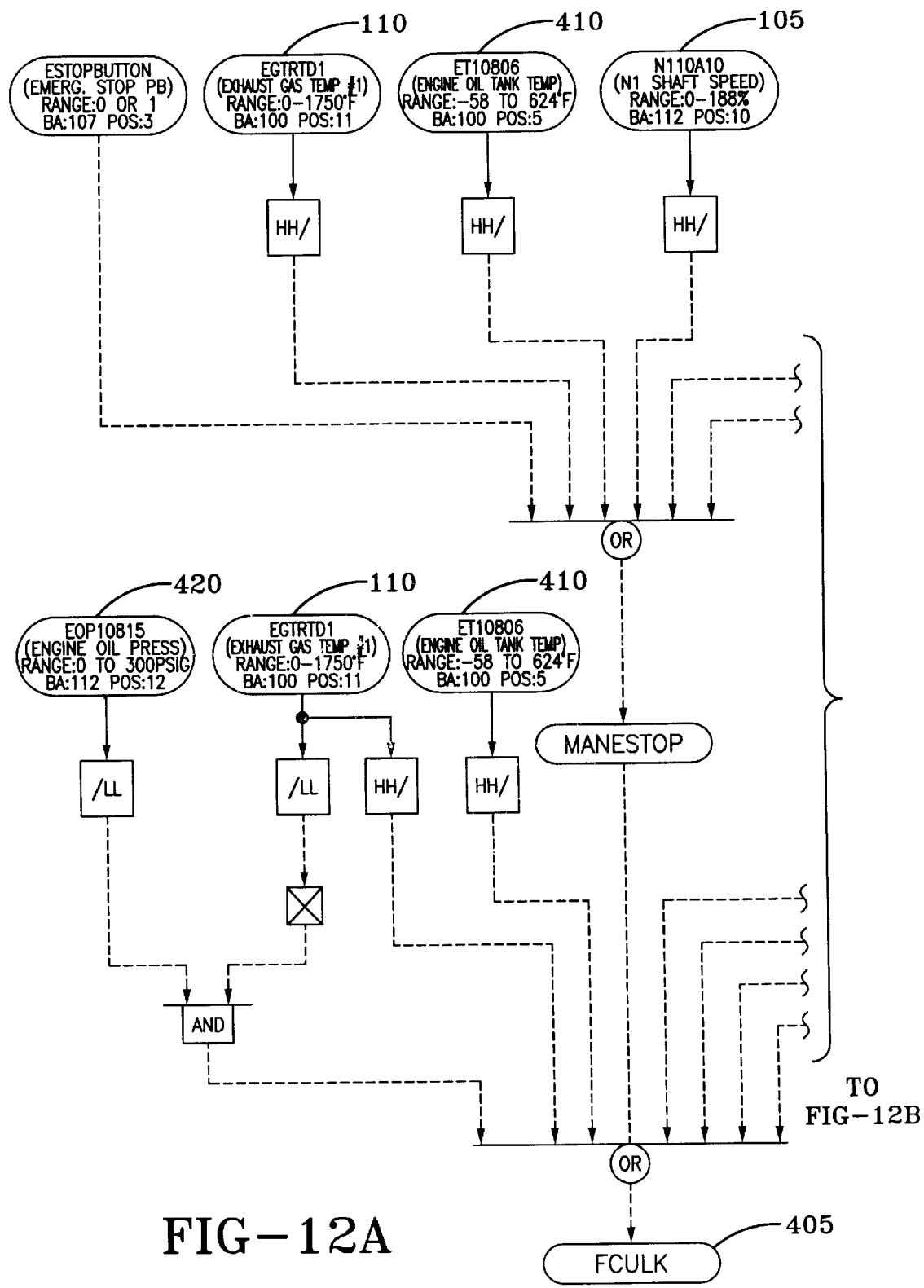
FIG. 12 is a schematic diagram representing the logic used by fuel controller lockout portion of one embodiment of the gas turbine electric powerplant microprocessor-based control system of the present invention.
Figure 12B:
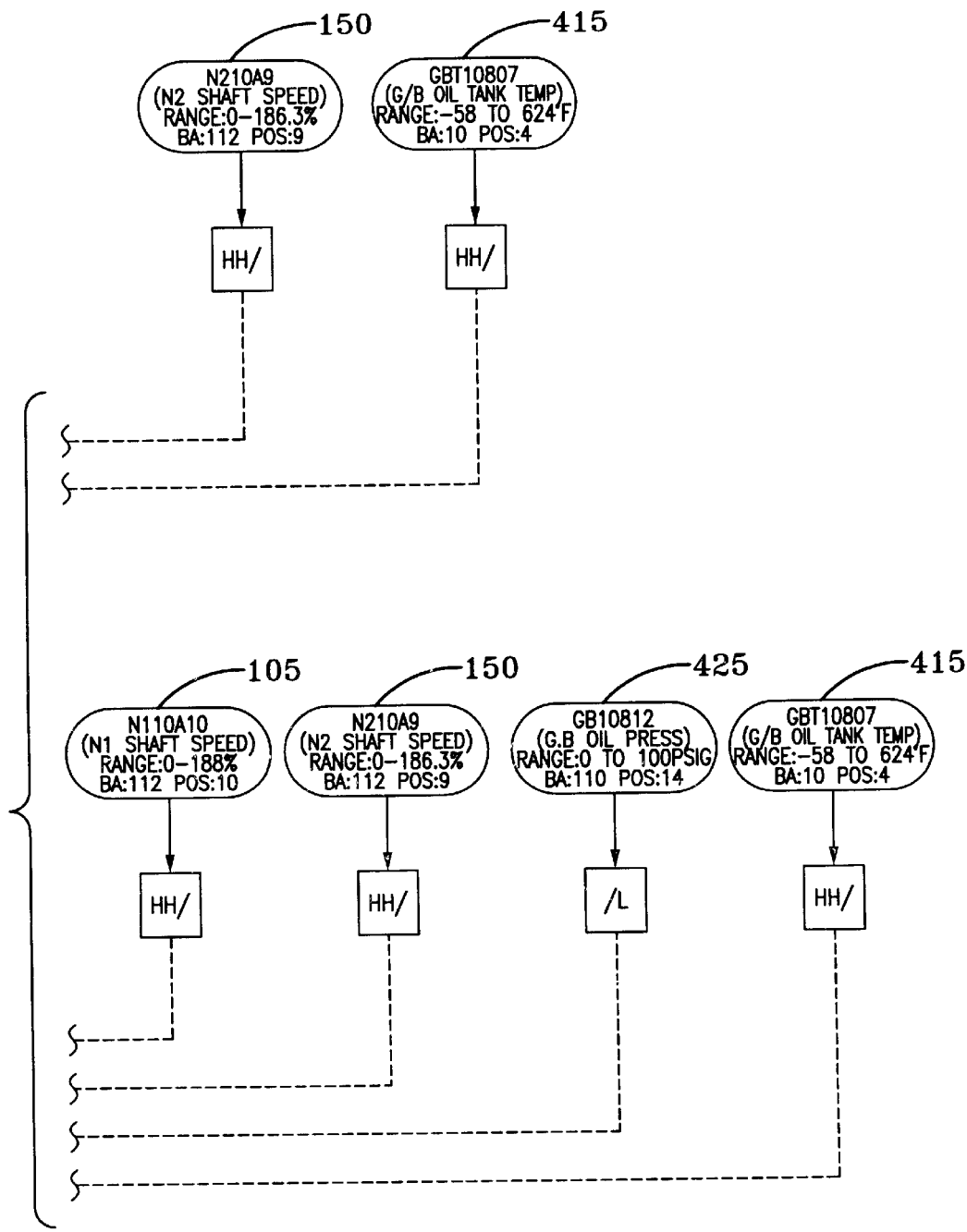

Lockout of the fuel control valve may be provided along with either a normal shutdown or emergency shutdown of the gas turbine electric powerplant. As can be seen in the logic diagram of FIG. 12, there are multiple gas turbine electric powerplant conditions that may initiate the fuel control lock sub-control system 405 and, thus, a lockout of the fuel control valve. In this particular embodiment of the microprocessor-based control system, inputs are provided for, exhaust gas temperature 110, turbine engine oil tank temperature 410, compressor turbine shaft speed 105, power turbine shaft speed 150, gearbox oil tank temperature 415, turbine engine oil pressure 420, and gearbox oil pressure 425. When the value of one or a combination of these inputs falls outside a predetermined range, the fuel control lock sub-control system 405 will cause a lockout of the fuel control valve, and a corresponding cutoff of the fuel supply to the gas turbine engine 30.

As discussed above, it is important that the gas turbine engine be quickly slowed, should it somehow become disconnected from the load provided by the gearbox and/or generator. Should the gas turbine engine be allowed to run with no load, the speed thereof would rapidly exceed desirable levels. Thus, the aforementioned air directing and overspeed control (compression relief) systems are provided. The microprocessor-based control system also controls each of these systems.

Figure 13A:
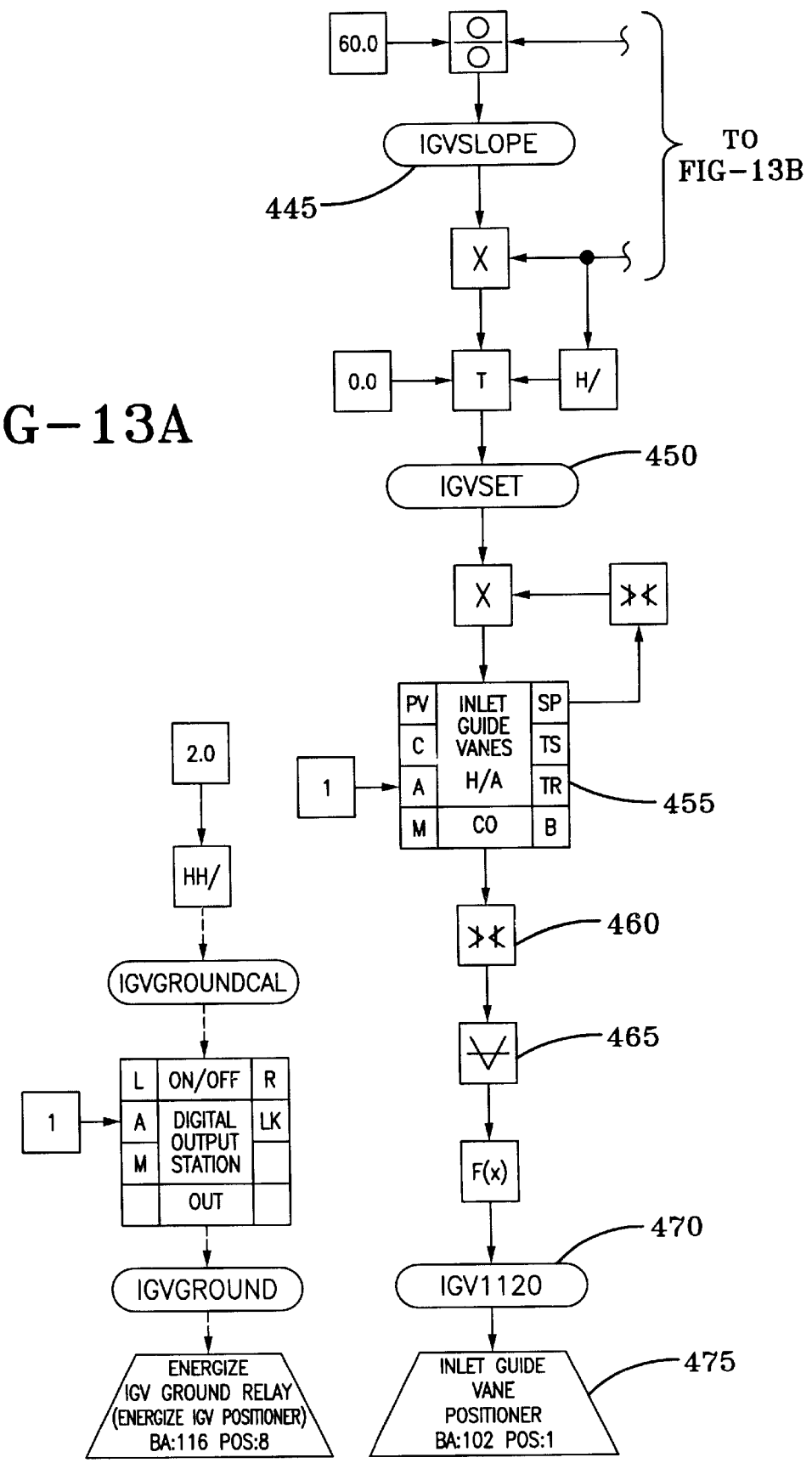
FIG. 13 is a schematic diagram representing the logic used by an inlet guide vane control portion of an overspeed control system of one embodiment of the gas turbine electric powerplant microprocessor-based control system of the present invention.
Figure 13B:
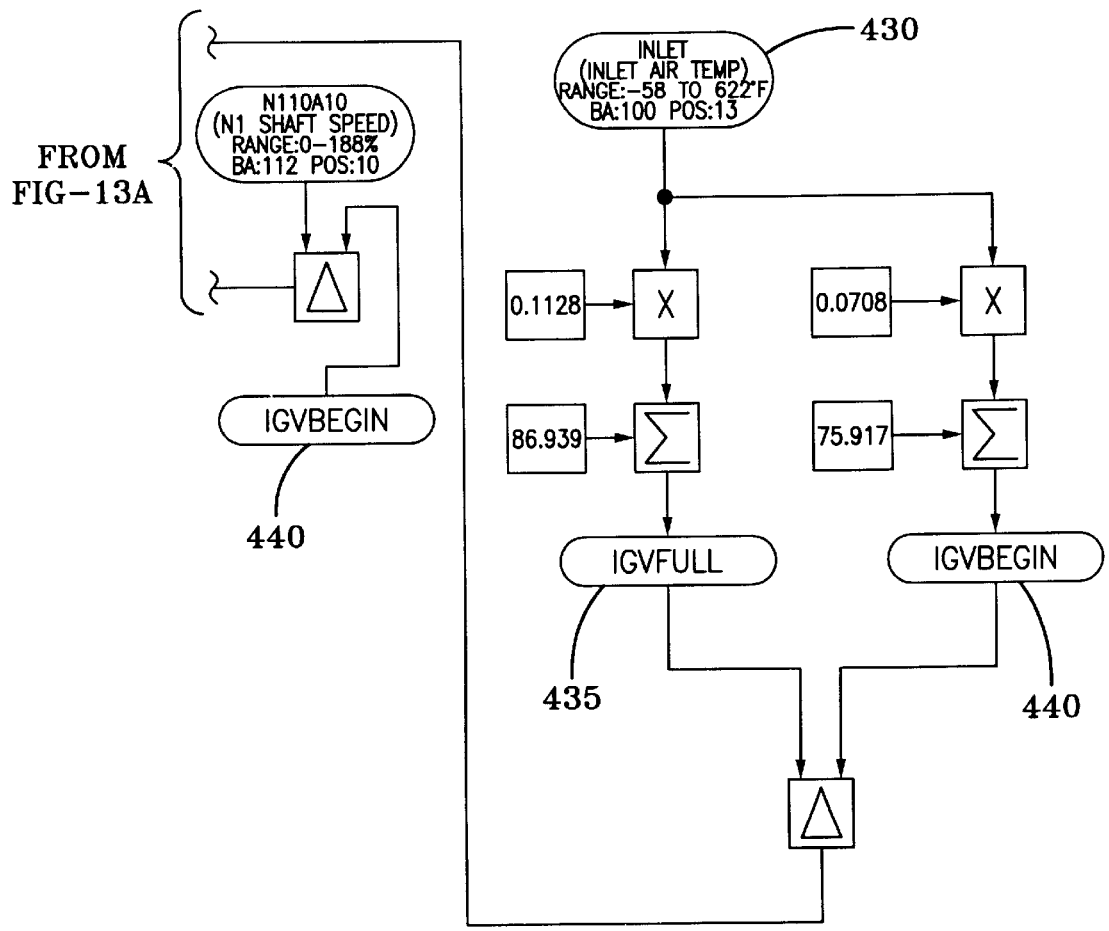

A logic diagram for the air directing system is shown in FIG. 13. As shown, the inlet air temperature input 430 is used to calculate a value for entry into each of an inlet guide vane (IGV) full position sub-control system 435 and an IGV begin position sub-control system 440. The difference between the output values of these sub-control systems 435, 440 is then used to determine an input value for an IGV slope sub-control system 445. The output of the IGV slope sub-control system 445 is altered by the output of the IGV begin sub-control system 440 and the value of the compressor turbine speed input 105, subjected to an analog transfer, and used as an input value for an IGV set sub-control system 450. The output of the IGV set sub-control system 450 is then arithmetically altered by a preset high & low limit value and input to an associated analog hand/auto control station 455 operating in auto mode. The output thereof is then passed through a high & low limiter 460 and a velocity limiter 465, and is used as an input for an IGV positioner sub-control system 470 that energizes an inlet guide vane positioner output 475 to properly position the inlet guide vanes of the gas turbine engine 30. Not only does the microprocessor-based control system act to set the proper inlet guide vane position during startup and operation of the gas turbine electric powerplant 10, but it also causes the inlet guide vane position to be set to less than an optimal angle when an overspeed condition occurs.

Figure 14:
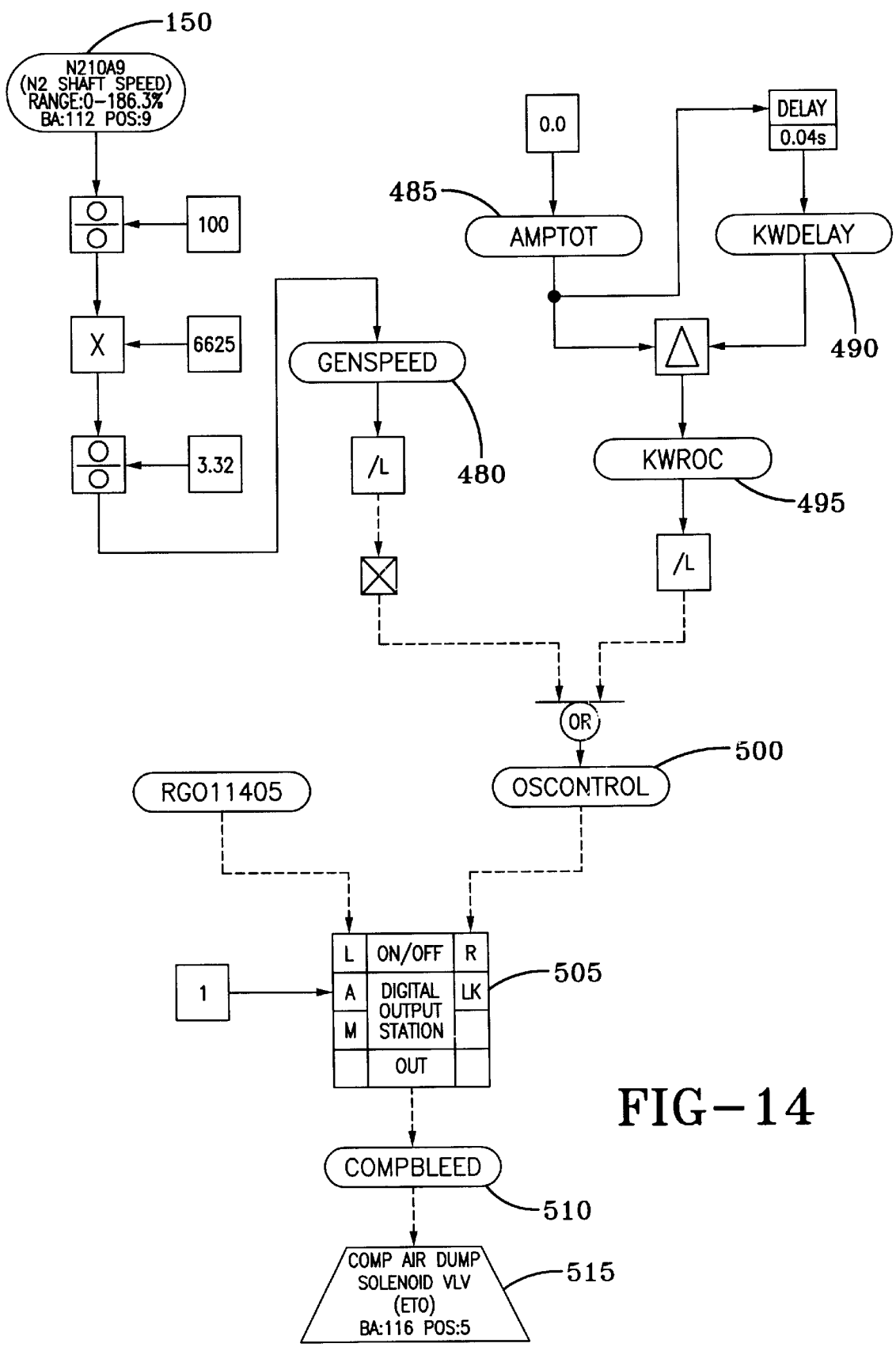
FIG. 14 is a schematic diagram representing the logic used by a compressor air dump valve control portion of an overspeed control system of one embodiment of the gas turbine electric powerplant microprocessor-based control system of the present invention.

The logic for the compression relief portion of the turbine overspeed control system is illustrated in FIG. 14. The power turbine shaft speed 105 is arithmetically altered to produce an input for a generator speed sub-control system 480. The output of the generator speed sub-control system 480 is then compared to a low limit setpoint. Two generator sub-control systems 485, 490, which relate to generator current and power are also initiated. The difference in the value of the output of these two sub-control systems 485, 490 is input to a third sub-control system 495, the output of which is compared to a low limit set point. If either of the signal values are less than the low limit set points to which they are compared, an overspeed condition is indicated, and an overspeed control sub-control system 500 is triggered. The output of the overspeed control sub-control system is then fed into a digital hand/auto station 505 operating in auto mode. The output of the digital hand/auto station 505 is then used as an input to a compressor bleed sub-control system 510, the output of which energizes the compression relief solenoid valve 515, thereby removing compression air from the compressor section of the gas turbine engine 30. The removal of compression air from the gas turbine engine 30 results in the slow down thereof.

The operator of the gas turbine electric powerplant 10 preferably communicates with the control system via an operator interface. Gas turbine electric powerplant conditions can preferably be monitored by reference to a CRT or other type of display screen portion of the operator interface. The operator interface can be located at the gas turbine electric powerplant 10 or, alternatively, may be located remotely. The operator can preferably enter lab data, set data, set points, outputs, and controller modes, and may acknowledge alarms, and perform multiple other tasks from, for example, a keyboard or a touch screen. Several views are preferably available that enable the operator to monitor various aspects of the gas turbine electric powerplant 10. The control system may also provide predictive modeling to allow the fastest and most accurate calculation and attainment of operation set points. A sample of the various operator screens associated with the microprocessor-based control system can be seen by reference to FIGS. 15–18.

The microprocessor-based control system of the present invention allows for automated startup, operation, and shutdown of the gas turbine electric powerplant 10. The microprocessor-based control system of the present invention further promotes the most efficient operation of the gas turbine electric powerplant 10, and allows the gas turbine electric powerplant to operated safely, even in an unattended condition. Thus, the microprocessor-based control system permits the gas turbine electric powerplant 10 to be used in a variety of locations and situations to provide both short-term and long-term electrical energy. It is to be understood that the particular embodiment of the gas turbine electric powerplant 10 and the microprocessor-based control system described herein is provided for purposes of illustration and not limitation, and other embodiments may be possible. As such, the scope of the invention is not to be considered limited by the above disclosure, and modifications are possible without departing from the spirit of the invention as evidenced by the following claims.

What is claimed is:

1. A control system for a gas turbine electric powerplant having a high rotational speed gas turbine engine, comprising:
    a microprocessor;
    sensors for monitoring various conditions of said gas turbine electric powerplant;
    a fuel flow control means for controlling a supply of fuel to said gas turbine engine;
    an air removal means for permitting air to be rapidly vented from a combustion section of said gas turbine engine in response to a signal from said microprocessor;
    an air directing means for controlling the direction of air flowing into said gas turbine engine;
    software in electrical communication with said microprocessor, said sensors, said fuel flow control means, said air removal means, and said air directing means; and
    a means of inputting setpoint data to said software;
    wherein, said software reads said setpoint data, determines appropriate control actions, and directly activates one or more appropriate control devices, thereby allowing said control system to automatically operate said gas turbine electric powerplant; and
    wherein said fuel flow control means, said air removal means, and said air directing means are used substantially simultaneously to automatically control an overspeed condition of said gas turbine engine, even when said gas turbine electric powerplant is operating in an unattended state.

2. The control system of claim 1, wherein said sensors are provided to monitor conditions selected from the group consisting of turbine speed, exhaust gas temperature, inlet air temperature, oil temperature, generator winding temperature, generator bearing temperature, gearbox bearing temperature, oil pressure, generator output, and inlet guide vane position.

3. The control system of claim 1, wherein said means of inputting setpoint data is a keyboard.

4. The control system of claim 1, wherein said means of inputting setpoint data is a touch screen.

5. The control system of claim 1, further comprising a fuel control valve in communication with said software, said fuel control valve having an integrated microprocessor that compares demand signals from said software with actual fuel flow, and makes adjustments to said valve accordingly.

6. The control system of claim 5, wherein said fuel control valve controls a supply of liquid fuel.

7. The control system of claim 5, wherein said fuel control valve controls a supply of gaseous fuel.

8. The control system of claim 1, further comprising an actuator in communication with said software, said actuator adapted, in response to a signal from said software, to alter the angle of a set of inlet guide vanes within a gas turbine engine of said gas turbine electric powerplant.

9. The control system of claim 1, further comprising a compression relief solenoid valve in communication with said software, said solenoid valve adapted, in response to a signal from said software, to allow the transfer of air from a combustion section of a gas turbine engine of said gas turbine electric powerplant.

10. The control system of claim 1, further comprising means for viewing gas turbine electric powerplant conditions.

11. The control system of claim 1, wherein said software is adapted to provide predictive modeling.

12. A microprocessor-based control system for a gas turbine electric powerplant having an aeroderivative gas turbine engine, comprising:
    a plurality of sensors for monitoring various gas turbine electric powerplant conditions;
    a compression relief system comprising a means for rapidly removing air from a combustion portion of said gas turbine engine during operation thereof, in response to a signal from said microprocessor;
    an air directing system for altering the angle at which incoming air impinges a set of compressor blades located within said gas turbine engine;
    software in communication with said microprocessor, said sensors, said compression relief system, and said air directing system;
    a fuel control valve for controlling the supply of fuel to said turbine engine, said fuel control valve in communication with said software and having an integrated microprocessor that compares demand signals from said software with actual fuel flow, and makes adjustments to said valve accordingly; and
    a means of inputting setpoint data to said software;
    wherein, said software reads said setpoint data, determines appropriate control actions, and directly activates one or more appropriate control devices, thereby allowing said control system to automatically operate said gas turbine electric powerplant; and
    wherein said compression relief system, said air directing system, and said fuel control valve are manipulated substantially simultaneously by said control system in response to detection of an overspeed condition of said gas turbine engine;
    whereby said overspeed condition is automatically controlled even when said gas turbine electric powerplant is operating in an unattended state.

13. The control system of claim 12, wherein said sensors are provided to monitor conditions selected from the group consisting of turbine speed, exhaust gas temperature, inlet air temperature, oil temperature, generator winding temperature, generator bearing temperature, gearbox bearing temperature, oil pressure, generator output, and inlet guide vane position.

14. The control system of claim 12, wherein said means of inputting setpoint data is a keyboard.

15. The control system of claim 12, wherein said means of inputting setpoint data is a touch screen.

16. The control system of claim 12, wherein said fuel control valve controls a supply of liquid fuel.

17. The control system of claim 12, wherein said fuel control valve controls a supply of gaseous fuel.

18. The control system of claim 12, wherein said compression relief system employs at least one solenoid valve in communication with said software, said solenoid valve adapted, in response to a signal from said software, to allow the transfer of air from said combustion section of said gas turbine engine to the atmosphere.

19. The control system of claim 12, wherein said compression relief system employs at least one solenoid valve in communication with said software, said solenoid valve adapted, in response to a signal from said software, to allow the transfer of air from said combustion section of said gas turbine engine to a collection device.

20. The control system of claim 12, wherein said air directing system employs an electromechanical actuator, in communication with said software.

21. The control system of claim 20, wherein said electromechanical actuator is coupled to a set of inlet guide vanes within said gas turbine engine.

22. The control system of claim 20, further comprising a microprocessor on said electromechanical actuator for controlling the movement thereof in response to a signal from said software.

23. The control system of claim 12, wherein said software is adapted to provide predictive modeling.

* * * * *